United States Patent
Smith et al.

(10) Patent No.: US 11,826,907 B1
(45) Date of Patent: Nov. 28, 2023

(54) ROBOTIC JOINT SYSTEM WITH LENGTH ADAPTER

(71) Applicant: Sarcos Corp., Salt Lake City, UT (US)

(72) Inventors: Fraser M. Smith, Salt Lake City, UT (US); Marc X. Olivier, Salt Lake City, UT (US); Michael J. Myers, Salt Lake City, UT (US); Chris Hirschi, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 17/890,181

(22) Filed: Aug. 17, 2022

(51) Int. Cl.
   *B25J 9/00* (2006.01)
   *B25J 9/14* (2006.01)

(52) U.S. Cl.
   CPC .............. *B25J 9/0006* (2013.01); *B25J 9/144* (2013.01); *B25J 9/146* (2013.01)

(58) Field of Classification Search
   CPC ........... B25J 9/0006; B25J 9/144; B25J 9/146
   USPC ........................ 318/568.11, 568.1, 567, 560
   See application file for complete search history.

(56) References Cited

U.S. PATENT DOCUMENTS

| | | |
|---|---|---|
| 1,880,138 A | 9/1932 | Franz |
| 2,850,189 A | 9/1958 | Leroy |
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 3,858,468 A | 1/1975 | Pasbrig |
| 4,046,262 A | 9/1977 | Vykukal et al. |
| 4,179,233 A | 12/1979 | Bromell et al. |
| 4,200,596 A | 4/1980 | Iiyama et al. |

(Continued)

FOREIGN PATENT DOCUMENTS

| | | |
|---|---|---|
| CN | 101214653 A | 7/2008 |
| CN | 101823517 A | 9/2010 |

(Continued)

OTHER PUBLICATIONS

Aghili et al., Sensing the torque in a robot's joints, www.memagazine.org/backissues/september98/features/torque/torque.html, 1998, pp. 1-9, The American Society of Mechanical Engineers.

(Continued)

*Primary Examiner* — David Luo

(57) ABSTRACT

A robotic joint system is provided that facilitates efficient movement of a ground-contacting robotic system, such as during a gait cycle. The robotic joint system can comprise a first support member, a second support member, and a joint assembly rotatably coupling the first support member to the second support member about an axis of rotation. The joint assembly can comprise a passive actuation system coupled between the first and second support members. The passive actuation system can comprise a passive actuator operable to store energy and to release energy to apply a torque to the joint assembly and the first and second support members, and a length adapter coupled to the passive actuator operable to selectively direct the output of the stored energy of the passive actuator.

22 Claims, 8 Drawing Sheets

(56) References Cited

U.S. PATENT DOCUMENTS

| | | |
|---|---|---|
| 4,251,791 A | 2/1981 | Yanagisawa et al. |
| 4,367,891 A | 1/1983 | Wauer et al. |
| 4,398,110 A | 8/1983 | Flinchbaugh et al. |
| 4,483,407 A | 11/1984 | Iwamoto et al. |
| 4,561,686 A | 12/1985 | Atchley |
| 4,567,417 A | 1/1986 | Francois et al. |
| 4,575,297 A | 3/1986 | Richter |
| 4,591,944 A | 5/1986 | Gravel |
| 4,598,601 A | 7/1986 | Molaug |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,402,690 A | 4/1995 | Sekiguchi et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 6,920,374 B2 | 7/2005 | Takenaka et al. |
| 7,168,748 B2 | 1/2007 | Townsend et al. |
| 7,319,919 B2 | 1/2008 | Takenaka et al. |
| 7,337,040 B2 | 2/2008 | Takenaka et al. |
| 7,379,789 B2 | 5/2008 | Takenaka et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,112,179 B2 * | 2/2012 | Nakajima .............. B25J 9/1628 700/261 |
| 8,132,835 B2 | 3/2012 | Ban et al. |
| 8,151,401 B2 | 4/2012 | Cheyne |
| 8,182,010 B2 | 5/2012 | Lee et al. |
| 8,204,626 B2 | 6/2012 | Yoshiike et al. |
| 8,245,728 B2 | 8/2012 | Jacobsen et al. |
| 8,295,975 B2 | 10/2012 | Arimatsu et al. |
| 8,336,420 B2 | 12/2012 | Carter et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,534,728 B1 | 9/2013 | Bosscher et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iversen et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,079,305 B2 | 7/2015 | Williamson et al. |
| 9,205,560 B1 | 12/2015 | Edsinger et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 | 5/2016 | Herr et al. |
| 9,346,165 B1 * | 5/2016 | Metzger ................ B25J 9/1674 |
| 9,446,510 B2 | 9/2016 | Vu et al. |
| 9,526,636 B2 | 12/2016 | Bedard et al. |
| 9,533,411 B2 | 1/2017 | Jacobsen et al. |
| 9,616,580 B2 | 4/2017 | Smith et al. |
| 9,618,937 B1 | 4/2017 | Blankespoor et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 9,862,090 B2 | 1/2018 | Kennedy et al. |
| 9,895,812 B2 | 2/2018 | Gonzalez et al. |
| 9,926,025 B1 | 3/2018 | Blankespoor et al. |

(56) References Cited

U.S. PATENT DOCUMENTS

| | | |
|---|---|---|
| 10,028,844 B2 | 7/2018 | Cheng et al. |
| 10,071,485 B2 | 9/2018 | Schiele et al. |
| 10,216,177 B2 | 2/2019 | Gildert et al. |
| 10,300,969 B1 | 5/2019 | Blackespoor et al. |
| 10,406,676 B2 | 9/2019 | Smith et al. |
| 10,512,583 B2 | 12/2019 | Smith |
| 10,518,404 B2 | 12/2019 | Barnes |
| 10,533,542 B2 | 1/2020 | Smith et al. |
| 10,561,564 B2 | 2/2020 | LaChappelle et al. |
| 10,566,914 B2 | 2/2020 | Fujita et al. |
| 10,609,896 B2 | 4/2020 | Kraaij et al. |
| 10,709,633 B2 | 7/2020 | Kazerooni et al. |
| 10,765,537 B2 | 9/2020 | Smith et al. |
| 10,828,767 B2 | 11/2020 | Smith et al. |
| 11,148,279 B1 | 10/2021 | Mooney et al. |
| 11,241,801 B2 | 2/2022 | Smith et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0060808 A1 | 3/2003 | Wilk |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0056592 A1 | 3/2007 | Angold et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1 | 1/2008 | Perry et al. |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0149993 A1 | 6/2009 | Neki et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0234996 A1 | 9/2010 | Schreiber et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0067124 A1 | 3/2014 | Williamson et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0217457 A1 | 8/2015 | Lipson et al. |
| 2015/0272749 A1 | 10/2015 | Amend, Jr. et al. |
| 2015/0278263 A1 | 10/2015 | Bowles et al. |
| 2015/0289995 A1 | 10/2015 | Wilkinson et al. |
| 2015/0321340 A1 | 11/2015 | Smith |
| 2015/0321342 A1 | 11/2015 | Smith et al. |
| 2016/0003268 A1 | 1/2016 | Shevchenko et al. |
| 2016/0114482 A1 | 4/2016 | Lessing et al. |
| 2016/0153508 A1 | 6/2016 | Battlogg |
| 2016/0279788 A1 | 9/2016 | Kanaoka et al. |
| 2016/0331556 A1 | 11/2016 | Wijesundara et al. |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2016/0332312 A1 | 11/2016 | Song et al. |
| 2017/0050310 A1 | 2/2017 | Kanaoka |
| 2017/0119132 A1 | 5/2017 | Pruess et al. |
| 2017/0326737 A1 | 11/2017 | Martin et al. |
| 2018/0126548 A1 | 5/2018 | Sugito et al. |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |
| 2018/0221237 A1 | 8/2018 | Swift et al. |
| 2018/0290309 A1 | 10/2018 | Becker et al. |
| 2018/0298976 A1 | 10/2018 | Battlogg |
| 2019/0022853 A1 | 1/2019 | Kim et al. |
| 2019/0105777 A1 | 4/2019 | Dalley et al. |
| 2019/0138423 A1 | 5/2019 | Agerstam et al. |
| 2019/0176320 A1 | 6/2019 | Smith et al. |
| 2019/0184576 A1 | 6/2019 | Smith et al. |
| 2020/0001450 A1 | 1/2020 | Smith et al. |
| 2020/0164523 A1 | 5/2020 | Hallock et al. |

(56) References Cited

U.S. PATENT DOCUMENTS

| | | |
|---|---|---|
| 2020/0281803 A1 | 9/2020 | Teng et al. |
| 2020/0312109 A1 | 10/2020 | Shionozaki |
| 2020/0346009 A1 | 11/2020 | Murray et al. |
| 2020/0368094 A1 | 11/2020 | Yoshimi et al. |
| 2020/0405417 A1 | 12/2020 | Shelton, IV et al. |
| 2021/0023693 A1 | 1/2021 | Berger et al. |
| 2021/0039269 A1 | 2/2021 | Son |
| 2021/0059780 A1 | 3/2021 | Sutherland et al. |
| 2021/0369536 A1 | 12/2021 | Mooney et al. |
| 2021/0378903 A1 | 12/2021 | Mooney et al. |
| 2023/0023083 A1 | 1/2023 | Shelton, IV et al. |

FOREIGN PATENT DOCUMENTS

| | | |
|---|---|---|
| CN | 101486191 B | 11/2012 |
| CN | 103610524 A | 3/2014 |
| CN | 203495949 U | 3/2014 |
| CN | 103802907 A | 5/2014 |
| CN | 203752160 U | 8/2014 |
| CN | 104843484 A | 8/2015 |
| CN | 105411813 A | 3/2016 |
| CN | 205250544 U | 5/2016 |
| CN | 105818143 A | 8/2016 |
| CN | 105856190 A | 8/2016 |
| CN | 107471203 A | 12/2017 |
| CN | 108081303 A | 5/2018 |
| CN | 111267992 A | 6/2020 |
| CN | 111616914 A | 9/2020 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| DE | 202018104980 U1 | 9/2018 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04 44296 U | 4/1992 |
| JP | H05-004177 A | 1/1993 |
| JP | H05-023989 A | 2/1993 |
| JP | H06-213266 A | 8/1994 |
| JP | H06-315879 A | 11/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2003-194104 A | 7/2003 |
| JP | 2004-041279 A | 2/2004 |
| JP | 2004-105261 A | 4/2004 |
| JP | 2004-195576 A | 7/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2010-263761 A | 11/2010 |
| JP | 2011-067941 A | 4/2011 |
| JP | 2011-156171 A | 8/2011 |
| JP | 2011-193899 A | 10/2011 |
| JP | 2011-230260 A | 11/2011 |
| JP | 2012-501739 A | 1/2012 |
| JP | 2012-125279 A | 7/2012 |
| JP | 2012-176476 A | 9/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-208293 A | 10/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014-200853 A | 10/2014 |
| JP | 2015-112649 A | 6/2015 |
| JP | 2015-212010 A | 11/2015 |
| JP | 2015-214019 A | 12/2015 |
| JP | 2016-539017 A | 12/2016 |
| JP | 2018-167375 A | 11/2018 |
| JP | 2020-037164 A | 3/2020 |
| JP | 6748374 B2 | 9/2020 |
| KR | 2005-0037754 A | 4/2005 |
| KR | 2007-0057209 A | 6/2007 |
| KR | 2010-0112670 | 10/2010 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| KR | 2019-0108386 A | 9/2019 |
| SE | 515372 C2 | 7/2001 |
| WO | WO 94/29605 | 12/1994 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2016/049622 A1 | 3/2016 |
| WO | WO 2017/148499 A1 | 9/2017 |
| WO | WO 2017/159504 A1 | 9/2017 |
| WO | WO 2018/118004 A1 | 6/2018 |

(56) References Cited

FOREIGN PATENT DOCUMENTS

| WO | WO 2018/211869 A1 | 11/2018 |
|---|---|---|
| WO | WO 2018/215705 A1 | 11/2018 |
| WO | WO 2019/060791 A1 | 3/2019 |
| WO | WO 2020/175949 A1 | 9/2020 |

OTHER PUBLICATIONS

Albu-Schaffer et al., A Unified Passivity Based Control Framework for Position, Torque and Impedance Control of Flexible Joint Robots, Institute of Robotics and Mechatronics, 2007, vol. 26, 17 pages, Germany.

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt0090605/.

Amikabir University of Technology, Manipulator Dynamics (Power Point), Computer Engineering and Information Technology Department, to the best of applicant's knowledge article was available before the application filing date, 44 pages.

Bao et al., A unified modeling and control design for precision transmission system with friction and backlash, Advances in Mechanical Engineering, 2016, vol. 8(5), 11 pages.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

David et al., Study of an External Passive Shock-absorbing Mechanism for Walking Robots, $8^{th}$ IEEE International Conference on Humanoid Robots, Dec. 1-3, 2008, pp. 435-440, Institute of Electrical and Electronics Engineers, Piscataway, New Jersey.

Desai et al., Robust Swing Leg Placement under Leg Disturbances, 2012 IEEE International Conference on Robotics and Biomimetics, Dec. 11-14, 2012, pp. 265-270, China.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Filippeschi et al., Survey of Motion Tracking Methods on Inertial Sensors: A Focus on Upper Limb Human Motion, www.mpdi.com/journal/sensors, 2017, 40 pages, Sensors, Switzerland.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers For Use In Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.

Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.

Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kaslin et al., Towards a Passive Adaptive Planar Foot with Ground Orientation and Contact Force Sensing for Legged Robots, IEEE International Conference on Intelligent Robots and Systems, Oct. 1-5, 2018, pp. 2707-2714, Institute of Electrical and Electronics Engineers, Piscataway, New Jersey.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al., A Force Reflected Exoskeleton-Type Masterarm for Human-Robot Interaction, IEEE Transactions on Systems, Man and Cybertentics-Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cnju.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Liu et al., Cat-inspired Mechanical Design of Self-Adaptive Toes for a Legged Robot, IEEE International Conference on Intelligent Robots and Systems, Oct. 9-14, 2016, pp. 2425-2430, Institute of Electrical and Electronics Engineers, Piscataway, New Jersey.

(56) References Cited

OTHER PUBLICATIONS

Liu et al., Concept and Design of a Lightweight Biped Robot for Walking on Rough Terrain, IEEE International Conference on Robotics and Biomimetics, 2017, 6 pages, Institute of Electrical and Electronics Engineers, Piscataway, New Jersey.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, 1/4-20 Thread, http://search.newport.com/?q=*&x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Ott et al., Admittance Control using a Base Force/Torque Sensor, Department of Mechano-Informatics, 2009, 6 pages, University of Tokyo, Japan.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rro/learn_more/low_ed/dof/, Oct. 25, 2006, 2 pages, University of Texas.

Roetenberg et al., Xsens MVN: Full 6DOF Human Motion Tracking Using Miniature Inertial Sensors, XSENS—Inertial Motion Capture, Jan. 2009, 9 pages, XSENS Technologies.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3, PLOS One, San Francisco, California.

Siddharth et al., Design and Analysis of a 1-DOF Walking Mechanism, http://siddharthswaminathan.in/files/WalkingMechanism.pdf, Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al., Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton, 3 pages, to the best of the applicant's knowledge article was available before the application filing date, U.S. Bionics, Inc., Berkeley, California.

Suleiman, Engineering an affordable exoskeleton, Phys.org, https://phys.org/news/2014-06-exoskeleton.html, Jun. 12, 2014, 5 pages, Science X Network.

Szczesna et al., Inertial Motion Capture Costume Design Study, 2017, 21 pages, Sensors, Switzerland.

Tmsuk, Rescue Robot "T- 53" release Control Technologies to Control the Synchronous Operation of the Arm, http://robot.watch.impress.co.jp/cda/news/2007/07/18/564.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton For Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25 -30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the $10^{th}$ International Workshop on Robot Motion and Control, Jul. 6-8, 2015, 6 pages, IEEE, Poland.

\* cited by examiner

ROBOTIC JOINT SYSTEM WITH LENGTH ADAPTER

BACKGROUND

A wide variety of exoskeleton robots, humanoid robots, other legged robots, robots on fixed or mobile platforms that possess a subset of a full limb complement, such as one or two arms with or without a fixed or actuated torso, and other robots or robotic systems exist, many of which seek the most efficient operation possible. One fundamental technical problem that continues to be a focus is how such systems, such as where energetic autonomy is concerned, can minimize power consumption while still providing required levels of force output. Indeed, power and how this is obtained and utilized remains an inevitable challenge in the world of robotics.

Designers of such robotic systems typically attempt to optimize operation based on the intended use or application. In many cases, either power or efficiency is sacrificed, at least to some extent. For instance, some robotic systems employ high-output power systems that can meet the force output demands of the robotic system, putting this ahead of any efficiency considerations. On the other hand, some robotic systems employ more efficient power systems in an attempt to improve efficiency, with force output being a secondary consideration.

High output force or power robotic systems designed to assist humans in various work-related or other tasks, while capable of performing such tasks, can be costly. Moreover, such robotic systems often are tethered to a power source as portable power remains limited in its capabilities. Efficient, yet low force output robotic systems can lack practicality for many applications to assist humans, inasmuch as many robotic systems that are designed to assist humans in work-related or other tasks that require levels of force that can at least match and preferably exceed the levels of force output that a human can provide in order to perform the task(s).

Overall, the power and efficient force production issue has been a challenging obstacle in the design of robotic systems with various efforts being made to maximize output while minimizing power consumption. Even small advances in this ratio of power and force to output energy consumption can be highly beneficial. While much research and development is ongoing to improve power sources, another way robotic systems can improve the power to energy output ratio is through the structural build of the robotic system, namely the way various components are configured, how these are controlled, and if the systems can take advantage of naturally occurring phenomenon, such as gravity or momentum.

One particular challenge in the design of robotic systems is to efficiently control power consumption during walking or running gait while also maintaining efficiency during other operations, such as during a squat. During a walking or a running gait cycle, a robotic limb can experience little to no load or resistance during a portion of the gait cycle, such as during a free-swing portion. However, upon a heel-strike portion of the gait cycle, a maximum load or resistance is almost immediately experienced by the robotic limb. In contrast, during an operation such as a squat, a load or resistance experienced by the robotic limb can change in a gradual manner. This can present challenges to create the required force profile while efficiently controlling power consumption to account for such different operations.

SUMMARY

An initial summary of the disclosed technology is provided here. Specific technology examples are described in further detail below. This initial summary is intended to set forth examples and aid readers in understanding the technology more quickly, but is not intended to identify key features or essential features of the technology nor is it intended to limit the scope of the claimed subject matter.

According to one example in the present disclosure, a robotic joint system is provided that can improve operating efficiencies of a ground-contacting robot, such as during gait or a gait cycle (walking, running, squatting, etc.). The robotic joint system can comprise a first support member, a second support member, and a joint assembly rotatably coupling the first support member to the second support member about an axis of rotation. The joint assembly can comprise a passive actuation system coupled between the first and second support members. The passive actuation system can comprise a passive actuator operable to store energy and to release energy to apply a torque to the joint assembly and the first and second support members, and a length adapter coupled to the passive actuator operable to selectively direct the output of the stored energy of the passive actuator.

In some examples, the length adapter can comprises a hydraulic cylinder that is coupled in series with the passive actuator. The hydraulic cylinder can comprise a piston disposed in an internal piston chamber. The piston can separate the internal piston chamber into a first chamber and a second chamber. The hydraulic cylinder can also comprise a piston rod attached to the piston. The piston rod can extend outside the hydraulic cylinder and can connect to the joint assembly, the first support member, or the second support member. The hydraulic cylinder can also comprise an incompressible fluid disposed in the first and second chambers.

In some examples, the length adapter can further comprise a fluid passageway connecting the first and second chambers, and a valve disposed on the fluid passageway to control fluid flow between the first and second chambers. When the valve is closed, a position of the piston within the internal piston chamber can be immovable. When the valve is open, the piston can be moveable (i.e., displaceable) within the internal piston chamber.

In some examples, the first and second support members can be an upper leg member and a lower leg member rotatable relative to one another about a joint provided by the joint assembly (e.g., a knee joint of a gait-capable robotic system, such as a wearable exoskeleton, a humanoid robot, etc.). As an example, the valve and passageway connecting the first and second chambers can be configured to be opened during a free swing portion of a walking gait cycle.

In some examples, the length adapter can further comprise a one-way valve in the fluid passageway. The one-way valve can allow fluid to flow between the first and second chambers to allow the piston and the piston rod to move to an extended position. In some examples, the piston rod extends from both sides of the piston. The passive actuator can comprise a blind bore into which the piston rod extends.

In some examples, the passive actuator can comprise an actuator piston disposed in an actuator housing. The actuator piston can separate an internal piston chamber of the actuator housing into a compression chamber and an expansion chamber. The passive actuator can comprise an orifice configured and operable to connect the compression chamber and the expansion chamber. In one example, the orifice can be configured to provide a limit on the fluid flow velocity, or in other words, to provide or facilitate choked flow of the fluid from the compression chamber to the expansion chamber. The orifice can be tuned to control the stored energy in the passive actuator and to control the first torque applied by the passive actuator. The orifice can be disposed in the actuator piston.

In some examples, the passive actuator can also comprise a one-way valve between the compression chamber and the expansion chamber. The one-way valve can be operable to allow gas to flow from the expansion chamber to the compression chamber when a pressure in the expansion chamber is greater than a pressure in the compression chamber.

In some examples, the length adapter can comprise a mechanical linkage. The mechanical linkage can comprise a hinged rod having a plurality of segments joined by one or more hinges. A frame support surface can be operable to support a hinge of the one or more hinges in a rigid state of the length adapter.

In some examples, the mechanical linkage can comprise a bistable mechanism. The length adapter can comprise a rotary actuator operable to rotate a segment of the plurality of segments. The rotary actuator can be operable to rotate the segment and the hinge away from the frame support surface and past an unstable equilibrium to transition the length adapter into a moveable state. The length adapter can direct the output of the stored energy of the passive actuator to apply the first torque when the length adapter is in the rigid state. The length adapter can also direct the output of the stored energy of the passive actuator to absorb the stored energy in the length adapter when the length adapter is in the movable state.

In some examples, the joint assembly can be disposed at a knee joint, and the first support member and a second support member can comprise an upper leg member and a lower leg member, respectively, of a robotic leg. The length adapter can be operable to be in the rigid state when the robotic leg is between heel-strike and toe-off during a walking or running gait cycle. The length adapter can also be operable to be in the movable state when the robotic leg is between toe-off and heel-strike during the walking or running gait cycle.

In another example of the present disclosure, a method for recovering energy in a robotic leg during movement is provided. The method can comprise storing energy in a passive actuator of a joint assembly between first and second support members of the robotic leg and operating a length adaptor coupled to the passive actuator to be in a rigid state at heel strike during a walking gait cycle of the robotic leg. Between the heel strike and toe-off of the walking gait cycle of the robotic leg, the method can comprise at least storing and partially returning the stored energy from the passive actuator by a first torque applied by the passive actuator. At toe-off of the walking gait cycle of the robotic leg (i.e. during the leg swing phase of the gait cycle), the method can comprise operating the length adaptor to be in a movable state such that rotation of the joint assembly is controlled by a user and/or a primary actuator of the joint assembly between toe-off and heel strike of the walking gait, and such that energy remaining in the passive actuator is absorbed by the length adapter.

In some examples, the method can comprise storing energy in the passive actuator during descent in a squatting cycle, and at least partially returning the stored energy from the passive actuator by a second torque applied by the passive actuator during ascent in a squatting cycle. The length adapter can be operated in the rigid state during the squatting cycle, and the passive actuator can be configured to be relatively more rigid during the walking gait cycle than during the squatting cycle.

In another example of the present disclosure, a passive actuation system is provided. The passive actuation system can comprise a passive actuator operable to store energy and to release energy, and a length adapter coupled to the passive actuator and operable to selectively direct the output of the stored energy to either be transferred to an external device or to be substantially absorbed ("substantially" here meaning that the energy is absorbed minus negligible losses) by the length adapter.

In some examples, the length adapter can comprise a hydraulic cylinder that is coupled in series with the passive actuator. The hydraulic cylinder can comprise a piston disposed in an internal piston chamber. The piston can separate the internal piston chamber into a first chamber and a second chamber. The hydraulic cylinder can also comprise a piston rod attached to the piston and extending outside the hydraulic cylinder. In some examples, an incompressible fluid can be disposed in the first and second chambers.

In some examples, the length adapter can further comprise a fluid passageway connecting the first and second chambers, and a valve disposed on the fluid passageway to control fluid flow between the first and second chambers. When the valve is closed, a position of the piston within the internal piston chamber can be immovable, and when the valve is open, the piston can be moveable (i.e., displaceable) within the internal piston chamber. In some examples, the external device is an actuator joint assembly at a knee joint of a robotic system. The valve can be configured to be opened during a free swing portion of a walking gait cycle of the robotic system.

In some examples, the length adapter further comprises a one-way valve in the fluid passageway. The one-way valve can allow fluid to flow between the first and second chambers to allow the piston and the piston rod to move to an extended position. In some examples, the piston rod can extend from both sides of the piston. The passive actuator can comprises a blind bore into which the piston rod extends.

In some examples, the passive actuator can comprise an actuator piston disposed in an actuator housing. The actuator piston can separate an internal piston chamber of the actuator housing into a compression chamber and an expansion chamber. The passive actuator can comprise an orifice operating as a choked flow channel connecting the compression chamber and the expansion chamber. The orifice can be tuned to control the stored energy in the passive actuator and to control the first torque applied by the passive actuator. The orifice can be disposed in the actuator piston.

In some examples, the passive actuator can also comprise a one-way valve between the compression chamber and the expansion chamber. The one-way valve can be operable to allow gas to flow from the expansion chamber to the compression chamber when a pressure in the expansion chamber is greater than a pressure in the compression chamber.

In some examples, the length adapter can comprise a mechanical linkage. The mechanical linkage can comprise a hinged rod having a plurality of segments joined by one or more hinges. A frame support surface can be operable to support a hinge of the one or more hinges in a rigid state of the length adapter.

In some examples, the mechanical linkage can comprise a bistable mechanism. The length adapter can comprise a rotary actuator operable to rotate a segment of the plurality of segments. The rotary actuator can be operable to rotate the segment and the hinge away from the frame support surface and past an unstable equilibrium to transition the length adapter into a moveable state. The length adapter can direct the output of the stored energy of the passive actuator to apply the first torque when the length adapter is in the rigid state. The length adapter can also direct the output of the stored energy of the passive action to absorb the stored energy in the length adapter when the length adapter is in the movable state.

In some examples, the joint assembly can be disposed at a knee joint, and the first support member and a second support member can comprise an upper leg member and a lower leg member, respectively, of a robotic leg. The length adapter can be operable to be in the rigid state when the robotic leg is between heel-strike and toe-off during a walking or running gait cycle. The length adapter can also be operable to be in the movable state when the robotic leg is between toe-off and heel-strike during the walking or running gait cycle.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Figure 1A:
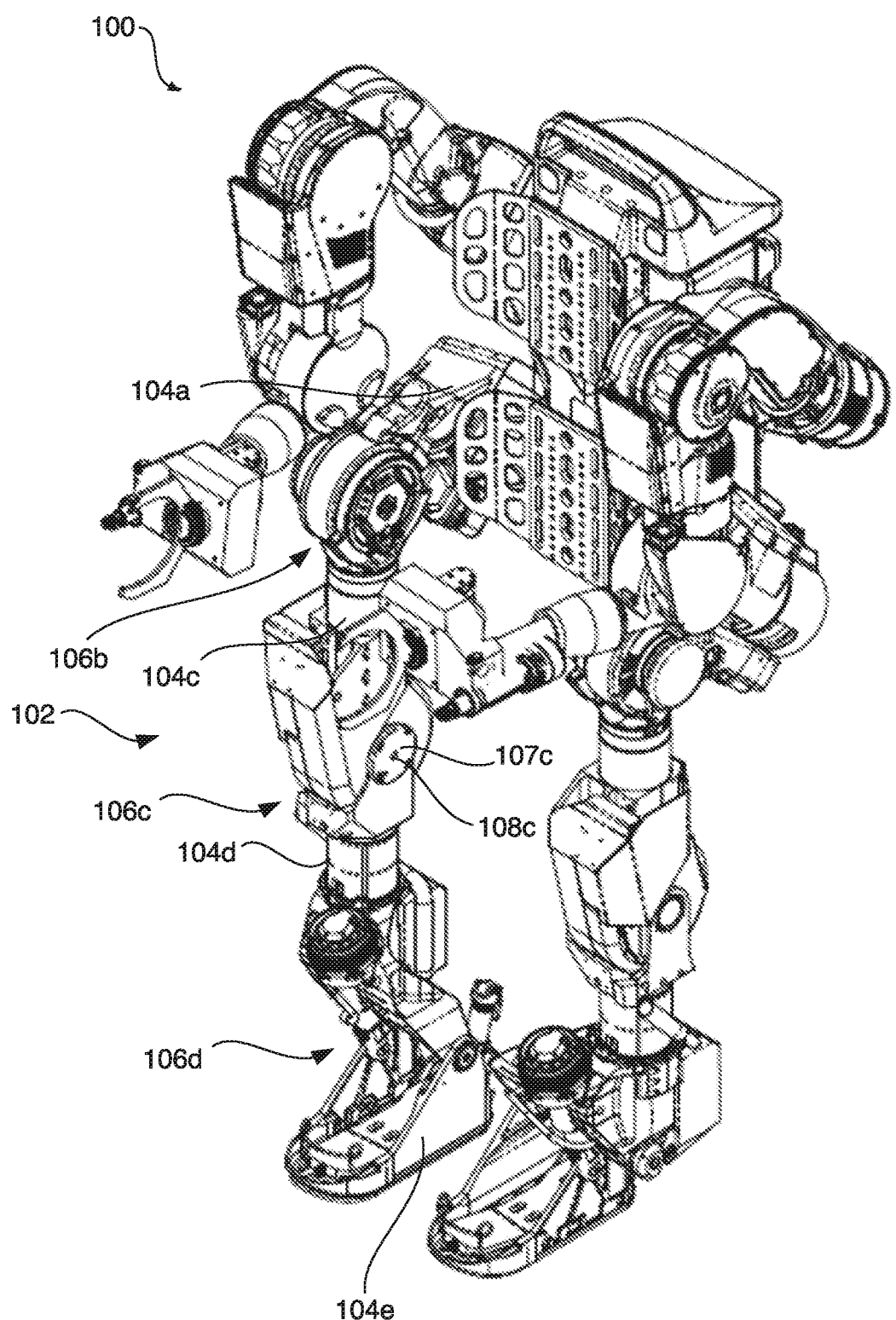
FIG. 1A is an isometric view of a robotic system, namely a wearable robotic exoskeleton, having at least one actuator joint assembly in accordance with an example of the present disclosure.
Figure 1B:
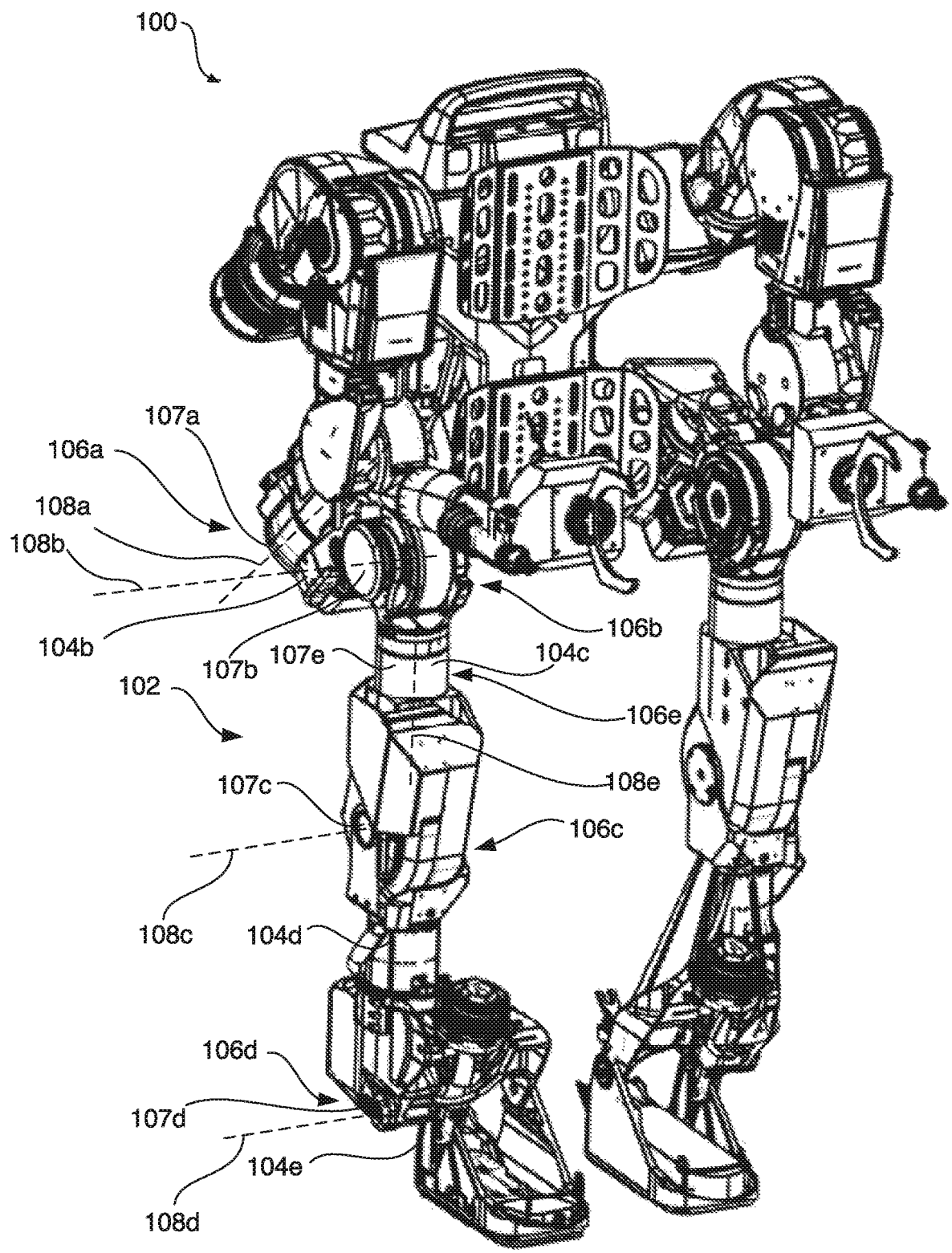
FIG. 1B is another isometric view of the robotic system of FIG. 1A.

One example of a robotic system 100 is generically and graphically illustrated in FIGS. 1A and 1B. The robotic system 100 is shown in the form of an exoskeleton, and particularly a lower or lower body exoskeleton wearable by a user about the lower body. However, this is not intended to be limiting in any way as the concepts discussed herein can be applicable to and incorporated into or implemented with various types of robotic devices, such as exoskeletons (both upper and lower body exoskeletons), humanoid robots or robotic devices, teleoperated robots or robotic devices, robotic arms, unmanned ground robots or robotic devices, master/slave robots or robotic devices (including those operable with or within a virtual environment), and any other types as will be apparent to those skilled in the art. In other words, with the robotic system 100 in the form of an exoskeleton as an example, the exoskeleton(s) as disclosed herein can be configured as a full-body exoskeleton, such as that shown in FIGS. 1A and 1B, or as only a lower body exoskeleton (e.g., some or all of the lower body portion of the exoskeleton of FIGS. 1A and 1B), or as only an upper body exoskeleton (e.g., some or all of the upper body portion of the exoskeleton of FIGS. 1A and 1B).

The robotic system 100 can comprise one or more actuator joint assemblies that provide and facilitate movement of the robotic system 100 in one or more degrees of freedom. Some or all of the actuator joint assemblies can comprise a primary actuator and/or a passive or a quasi-passive actuator.

A "joint assembly" refers to a structure or assembly at a joint between two or more members (e.g., structural members, such as structural members that make up part of a limb of an exoskeleton or other type of robotic system) that connect the two or members to each other. A joint assembly can optionally include structure or an assembly that allows relative movement of the two or more members at the joint, such as to allow the two or more members to rotate relative to one another, or to allow the two or more members to translate relative to each other (in the case of a prismatic joint). A joint assembly can also optionally include actuators and/or linkages connected to the two or more members to facilitate or cause the relative movement of the two or members at the joint.

An "actuator joint assembly" comprises a joint assembly having one or more actuators configured to be actuatable to cause relative movement between the two or more members at the joint. In some examples, the actuators can comprise at least one of a primary actuator or a passive or quasi-passive actuator, which facilitates rotation of the joint assembly.

A "joint" is defined as a place where two or more members are joined together. The two or more members can be joined together at a joint such that there is no relative movement between the members or such that the members can move relative to one another in one or more degrees of freedom.

A "member" is a rigid support that is a constituent part of a structure or system. For example, in the robotic system described herein, a member of the robotic system can correspond to a limb portion of a human body, such as an upper leg, a lower leg, an upper arm, etc. that extend between and are connected at joints of the robotic system.

In some examples, the upper extremity actuator joint assemblies (i.e., those in the upper body exoskeleton) can comprise a different configuration and/or function as compared to lower extremity actuator joint assemblies (i.e., those in the lower body exoskeleton). In other examples, they can comprise a similar configuration and function. For example, lower extremity actuator joint assemblies can provide an energy recovery mechanism and function during a portion of cyclic motions, such during a portion of a walking or running gait cycle, and an ability to move during other parts of the gait cycle (e.g. during the leg swing portion of the walking gait cycle) or for other activities. Upper actuator joint assemblies can provide gravity compensation and function, such as for gravity compensation when the upper extremities are in support of a load, such as cargo, armor, weapon masses, or any other load carried by the robotic system 100.

In both cases, an energy storage and recovery passive actuator can be incorporated into an actuator joint assembly and can function to reduce the demand on the power supply and on the primary actuators that may be used to do work in parallel with the passive actuators. Further, the passive actuator can improve the overall efficiency of the robotic system 100 compared to a similar robotic system without the benefit of one or more passive actuators. It is noted that, in example robotic systems, such as those described herein, the types of passive actuators used at the different joints and within the associated actuator joint assemblies can be the same or different. Using the example of the robotic system 100, the same or different passive actuators can be used between the upper and lower extremities of the robotic system 100, or between the various actuator joint assemblies within the upper extremity (the same being the case with the lower extremity), or between various actuator joint assemblies within the same limb.

A passive actuator described herein refers to an actuator that is not directly actuatable, but that can provide a force or torque after on being acted upon by a torque, force, or load external to the passive actuator. For example, the passive actuators described herein can comprise air springs that have a continuous active state. In some examples, the passive actuators described herein can be referred to as quasi-passive actuators because they can be operable in both an active and an inactive state or mode of operation (as compared to being entirely passive actuators (e.g., simple springs) that are always either storing energy or releasing energy during all rotational movements of a joint, or other movements of a mechanical system). Depending upon the configuration, example quasi-passive actuators can comprise a first active state in which the quasi-passive actuators can be actuated to store and release energy to provide a spring-like function during various rotations of a joint of the robotic system, a second inactive state in which the quasi-passive actuators can be caused to be inactive, such that energy is stored and released not in a spring-like manner or function, but rather in a near constant force actuator manner or function (in some configurations the quasi-passive actuators can behave as a constant force actuator to apply a residual biasing force to the joint) during various rotations of the joint, and in some cases, depending upon the type and/or configuration of the quasi-passive actuators, a third semi-active or partially active state in which the quasi-passive actuators can be partially actuated to store and release energy during various rotations of the joint, such as via control of a valve associated with the quasi-passive actuator. In some example robotic systems, the quasi-passive actuators can be switchable in real-time between the different modes or states of operation as needed or desired depending on, for example, needed or desired tasks and corresponding rotation movements, various torque or load requirements of the one or more joints of the robotic system, or needed or desired braking forces. Examples of quasi-passive actuators are set forth in U.S. application Ser. No. 17897762, which was filed on Aug. 29, 2022, the contents of which are hereby incorporated by reference.

In some examples, the robotic system 100 can comprise an upper exoskeleton and a lower exoskeleton, each having left and right exoskeleton limbs. With reference to the lower exoskeleton limb 102 as an example, exoskeleton limb 102 can comprise a plurality of rotatably coupled support members 104*a-e* that are each part of one or more joint systems, and that are rotatable via one or more joint assemblies (i.e., a support member can be part of more than one joint system). Some of the joint assemblies may or may not comprise an actuator joint assembly having a passive or quasi-passive actuator. Indeed, some of the joint assemblies can comprise a powered joint assembly without a passive or quasi-passive actuator, or an unpowered joint assembly (moveable by a force applied by a human). The support members 104*a-e* can each comprise a single rigid structural support or a collection of rigid, structural supports, that are directly or indirectly coupled together, that extend(s) from a joint or that extend(s) between two joints within the limb 102 of the exoskeleton, or that link the joints together, much like the bones in the human body extending from or between various joints.

The support members 104*a-e* can be respectively coupled together for relative movement at respective joints, such as the joints provided by the actuator joint assemblies 106*a-d*, each of these defining and providing a degree of freedom about a respective axis of rotation 108*a-d*. The rotational degrees of freedom about the axes of rotation 108*a-d* can correspond to one or more degrees of freedom of the human leg. For example, the rotational degrees of freedom about the axes 108*a-d* can correspond, respectively, to hip abduction/adduction, hip flexion/extension, knee flexion/extension, and ankle flexion/extension. Similarly, although not shown, degrees of freedom about respective axes of rotation within an upper body exoskeleton can correspond to one or more degrees of freedom of a human arm. For example, the degrees of freedom about the axes of rotation in an upper body exoskeleton limb can correspond to shoulder abduction/adduction, shoulder flexion/extension, shoulder medial/lateral rotation, elbow flexion/extension, wrist pronation/supination, and wrist flexion/extension. A degree of freedom corresponding to wrist abduction/adduction can also be included, as desired.

A human user or operator may use or interact with the exoskeleton robotic system 100 by interfacing with the robotic system 100. This can be accomplished in a variety of ways. For example, an operator may interface with the robotic system 100 by placing his or her foot into a foot portion of the system, where the foot of the operator can be in contact with a corresponding force sensor. Portions of the human operator can also be in contact with other force sensors of the exoskeleton robotic system 100 located at various locations of the robotic system 100. For example, a hip portion of the robotic system 100 can have one or more force sensors configured to interact with the operator's hip. The operator can be coupled to the robotic system 100 by a waist strap or other appropriate coupling device. The operator can be further coupled to the robotic system 100 by a foot strap or other securing mechanism. In one aspect, various force sensors can be located about a hip, knee or ankle portion of the robotic system 100, corresponding to respective parts of the operator. While reference is made to sensors disposed at specific locations on or about the robotic system 100, it should be understood that position or force sensors, or both, can be strategically placed at numerous locations on or about the robotic system 100 in order to facilitate proper operation of the robotic system 100.

As a general overview, actuator joint assemblies 106a-d can be associated with various degrees of freedom of the exoskeleton to provide forces or torques to the support members in the respective degrees of freedom. Unlike traditional exoskeleton systems and devices, the robotic system 100 can be configured, such that one or more actuator joint assemblies are configured to recover energy at select times during operation of the robotic system, which can reduce complexity and power consumption of the robotic system 100. For example, the actuator joint assembly 106c, which defines a degree of freedom corresponding to a degree of freedom of knee flexion/extension, can be configured with a passive or quasi-passive actuator to store energy during a first rotation (e.g., a first gait movement (between heel strike and toe off), or during descent of the robot into a squatting position) and then release such energy during a second rotation (e.g., a second gait movement (at toe off and during swing phase), or during ascension of the robot from a squatting position) to apply a torque to the joint, or more specifically to one or more components making up the joint (e.g., the output member) to rotate the joint, of the tunable actuator joint assembly 106c that facilitates knee flexion/extension. In doing so, the movement cycle of the exoskeleton type robotic system 100 is made more efficient as compared to a similar robotic system without a passive or quasi-passive actuator as energy is able to be stored and released at select and precise moments during a movement cycle (such as during a squat or while walking). Additional actuator joint assemblies 106b and 106d combined with the actuator joint assembly 106c can still further increase the efficiency of the robotic system 100 by storing and releasing energy at precise and select times during rotation of their respective joints 107b and 107d. In some examples, the actuator joint assembly 106c and its passive or quasi-passive actuator can be dynamically tuned (i.e., tuned in real time) to comprise different operating capabilities depending upon the type of motion to be performed by the exoskeleton. In such cases, the actuator joint assembly can be termed a tunable actuator joint assembly.

In one aspect, the torque from the passive or quasi-passive actuator of the actuator joint assembly 106c can be considered part of an augmented torque at the joint in that it combines with the torque generated by a primary actuator of the actuator joint assembly 106c. In this example, a primary actuator can be considered to apply a primary torque, and the passive or quasi-passive actuator can apply a torque that combines with the primary torque to generate an augmented torque at the joint. The torque from the passive or quasi-passive actuator can be applied in parallel with the primary torque to assist the primary actuator to rotate the support members connected at a joint of the joint system and to the actuator joint assembly 106c. in other examples, the torque from the quasi-passive actuator can be applied to assist (torques are applied in the same sign or rotational direction) or to work against the torque from the primary actuator (the torques are applied in different signs or rotational directions).

The actuator joint assemblies 106a-d can thus comprise a passive or quasi-passive mechanism that, in one advantage, is operable to recover energy (e.g., energy lost during some motions of the robotic system) to reduce or minimize power consumption required to actuate the joint assemblies 106a-d. Therefore, when combining a plurality of actuator joint assemblies within a robotic system, such as the lower body exoskeleton shown in FIGS. 1A and 1B, for example, a significant amount of energy can be recovered and utilized during movement (via hip, knee, and ankle joints), which can reduce weight, size, complexity, and overall power consumption of the exoskeleton.

In the example of a quasi-passive actuator, the actuator joint assembly 106c can be selectively controlled, such that the quasi-passive actuator can be engaged to operate (i.e., caused to enter an active or operating state or condition in which the quasi-passive actuator is operable and enabled to store and release energy (an active or a semi-active state in some examples, depending upon the type and/or configuration of the valve assembly controlling the quasi-passive actuator)) and disengaged from operation (i.e., caused to enter an inactive or non-operating state or condition or configuration where it neither stores nor releases energy in a spring-like manner, but stores and releases energy in a near constant force actuator manner (stores and releases a relatively low amount of energy)) during joint rotation. In the inactive state, this can facilitate the "free swing" of the joint with reduced or negligible resistance to the rotation of the joint as the operator walks or runs, for instance. On the other hand, by operating in parallel with the primary actuator (e.g., actuation of a primary motor operable to actuate the joint), the quasi-passive actuator can provide or apply a torque in parallel with the torque provided by the primary actuator (i.e., a torque that combined with the torque generated by the primary actuator). In some examples depending on the motion or operation, the quasi-passive actuator can apply a torque that works with a torque provided by the primary actuator (i.e. the torques provided by the quasi-passive actuator and the primary actuator are applied in the same direction), and in other examples the quasi-passive actuator can apply a torque that works against a torque provided by the primary actuator (i.e. the torques provided by the quasi-passive actuator and the primary actuator can be applied in different directions. In some examples, such as when the quasi-passive actuator acts in a semi-active state, the quasi-passive actuator can apply a braking force to the joint, such as by operating as a damper.

The quasi-passive actuator of the tunable actuator joint assembly 106c can comprise a compact internal valve that can be controlled and operated to change the states or modes of the quasi-passive actuator, namely to switch between an active state (where the actuator acts as a spring for transient energy storage and recovery), and an inactive state (where the quasi-passive linear pneumatic actuator does not store or release energy in a spring-like manner, but instead employs a shunting function that allows the quasi-passive actuator (e.g., a piston and piston cylinder in a linear pneumatic type of actuator) to move (i.e., the piston displaces) via the fluid moving within the quasi-passive actuator and the valve assembly upon movement or rotation of the joint, except for friction and movement of fluid through the valve assembly and/or for a residual biasing force that can be configured with the quasi-passive actuator). Depending upon the type and configuration of the valve, the quasi-passive actuator can also be switched into a semi-active state by partially opening the valve (or by actuating the valve using pulse-width modulation). Moreover, the tunable actuator joint assembly 106c can be "tuned" to comprise a desired stiffness. Thus, the magnitude of stiffness for a given joint is adjustable or variable for mission or task specific payloads and terrain-specific gaits while the active valve controls exactly when that stiffness is activated and engaged for energy storage and recovery, and when it is inactive and disengaged to enable movement within the quasi-passive actuator and to facilitate free swing of the associated joint and joint system. The result is effectively a quasi-passive mechanism that, in one advantage, is selectively operable to recover energy (e.g., energy lost during some motions of the associated joint and joint system), and to reduce or minimize power consumption required to actuate the joint and joint system. Therefore, when combining a plurality of tunable actuator joint assemblies within the robotic system 100, such as the exoskeleton shown, for example, a significant amount of energy can be recovered and utilized during movement via respective robotic joint systems, such as those corresponding to shoulder, elbow, wrist, hip, knee, and ankle joints of a human, which can reduce weight, size, complexity, and overall power consumption of the robotic system 100.

As indicated above, the robotic system 100 can comprise various exoskeleton limbs as part of the full body exoskeleton shown. The full body exoskeleton can comprise an upper body exoskeleton portion and a lower body exoskeleton portion operable with the upper body exoskeleton portion, with each portion comprising one or more degrees of freedom of movement facilitated by one or more joint assemblies, including one or more actuator joint assemblies having a passive or quasi-passive actuator. Each of the upper and lower body exoskeleton portions can comprise left and right exoskeleton limbs. For example, the right exoskeleton limb 102, which is part of the lower body exoskeleton portion, can comprise a plurality of lower body support members 104a-e and joints 107a-d. The support members 104a-e can be coupled together as shown for relative movement about a plurality of respective joints 107a-d defining a plurality of degrees of freedom about respective axes of rotation. The right exoskeleton limb 102 can comprise a plurality of actuator joint assemblies (e.g., see actuator joint assemblies 106a, 106b, 106c and 106d) defining and providing at least some of the respective joints 107a-d. In some robotic system configurations, the actuator joint assemblies having passive or quasi-passive actuators can be combined with joint assemblies that do not have or possess a passive or quasi-passive actuator, or a primary actuator, or both. For example, the right lower exoskeleton limb 102 shown can comprise a joint assembly 106d having a joint 107e that rotates about an axis of rotation 108e, which corresponds to medial/lateral rotational degree of freedom of a hip of a human. In one example, the joint assembly 106e can comprise an actuator. In another example, the joint assembly 106e can be a completely passive joint assembly without an actuator that is rotated under the power of the operator. In both of these examples, the joint assembly 106e can be configured without a passive or quasi-passive actuator. However, it is noted that the joint assembly 106e can, in another example, comprise a quasi-passive actuator, and thus be considered a tunable actuator joint assembly. Indeed, in this example, the quasi-passive actuator can be implemented or incorporated into the joint assembly 106e to store and release energy in an active state, and/or to provide a biasing function that biases the joint 107e to a default rotational position in an inactive state similar to other joint systems discussed herein. In the active state, the quasi-passive actuator can be configured to function as a spring to store and release energy upon rotation of the joint 107e by the user (or a primary actuator of the joint assembly 106e), which in turn causes the quasi-passive actuator to apply a torque to the joint 107e to rotate the joint 107e as discussed herein. Alternatively, as the quasi-passive actuator can be configured with a default inactive state where it behaves as a constant force actuator (i.e., the valve assembly controlling the quasi-passive actuator having a default open position), the quasi-passive actuator, and therefore the joint 107e, can be biased to the default position due to the difference in forces acting on both sides of the piston cylinder of the quasi-passive actuator.

Each joint system can comprise a joint assembly, and each joint assembly can comprise a joint. In other words, one or more of the joints 107a-e can be part of one of the respective joint assemblies 106a-e, or the joint assemblies 106a-e can comprise one or more of the joints 107a-e. As indicated, a joint assembly can comprise an actuator joint assembly having a primary actuator and/or a passive or quasi-passive actuator. As one example, the right limb 102 of the exoskeleton shown can comprise the actuator joint assembly 106c, which can be disposed at and can comprise the right knee joint 107c operable to facilitate movement of the robotic system 100 in a degree of freedom corresponding to a knee flex/extend degree of freedom in a human. In another example, the right limb 102 of the exoskeleton shown can comprise an actuator joint assembly 106a, which can be disposed at and can comprise the hip joint 107a operable to facilitate movement of the robotic system 100 in a degree of freedom corresponding to a hip abduction/adduction degree of freedom of a human. In still another example, the right limb 102 of the exoskeleton shown can comprise an actuator joint assembly 106b, which can be disposed at and can comprise the hip joint 107b operable to facilitate movement of the robotic system 100 in a degree of freedom corresponding to a hip flex/extend degree of freedom of a human. In still another example, the right limb 102 of the exoskeleton shown can comprise an actuator joint assembly 106d, which can be disposed at and can comprise the ankle joint 107d operable to facilitate movement of the robotic system 100 about in a degree of freedom to rotate about axis 108d corresponding to an ankle flex/extend degree of freedom of a human.

It will be appreciated, although not detailed herein, that the robotic system 100 can comprise other joint systems having respective joint assemblies at various joints. For example, the exoskeleton shown can comprise other joints, such as joints of the lower left extremity and joints of the upper left and right extremities of the exoskeleton. A joint assembly or actuator joint assembly can be disposed at each of these joint, and each joint assembly or actuator joint assembly can define and provide a degree of freedom about a respective axis of rotation. Moreover, some of these other joint assemblies can comprise actuator joint assemblies having a primary actuator and/or a passive or quasi-passive actuator, as described herein. For example, it will be apparent to those skilled in the art that the various degrees of freedom about various axes of rotation in the upper body exoskeleton of the robotic system 100 can correspond to shoulder abduction/adduction, shoulder flexion/extension, shoulder medial/lateral rotation, elbow flexion/extension, wrist pronation/supination, and wrist flexion/extension. A degree of freedom corresponding to wrist abduction/adduction can also be included, as desired. Similarly, the various degrees of freedom about various axes of rotation in the lower body exoskeleton of the robotic system 100 can correspond to hip abduction/adduction, hip flexion/extension, knee flexion/extension, ankle medial/lateral rotation, and ankle flexion/extension. Each of these degrees of freedom and their axes of rotation can be provided by a joint assembly (which can comprise in any of these an actuator joint assembly) operable with respective support members rotatable relative to one another via a joint of the respective joint assembly as part of a respective joint system, as discussed herein.

Figure 2A:
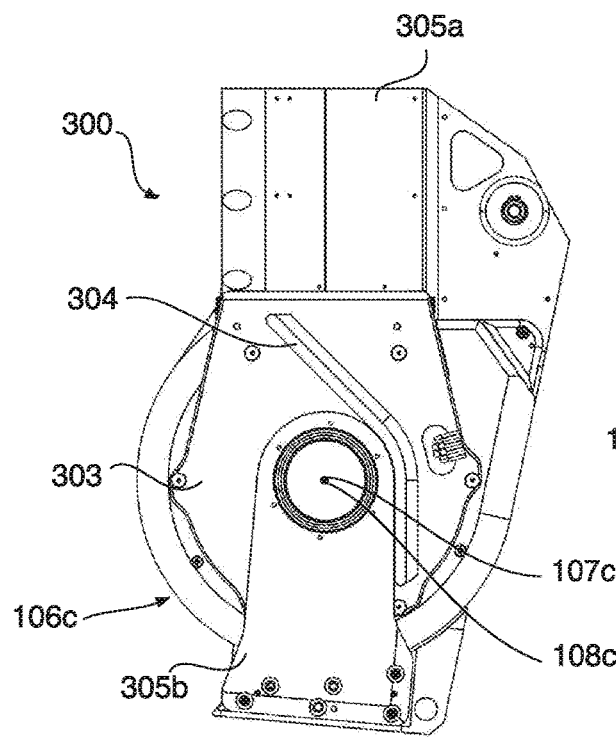
FIG. 2A is a side view of a robotic joint system of the robotic system of FIGS. 1A and 1B, the joint system comprising an actuator joint assembly connected to first and second support members in accordance with an example of the present disclosure, with the first and second support members shown in an extended position.
Figure 2B:
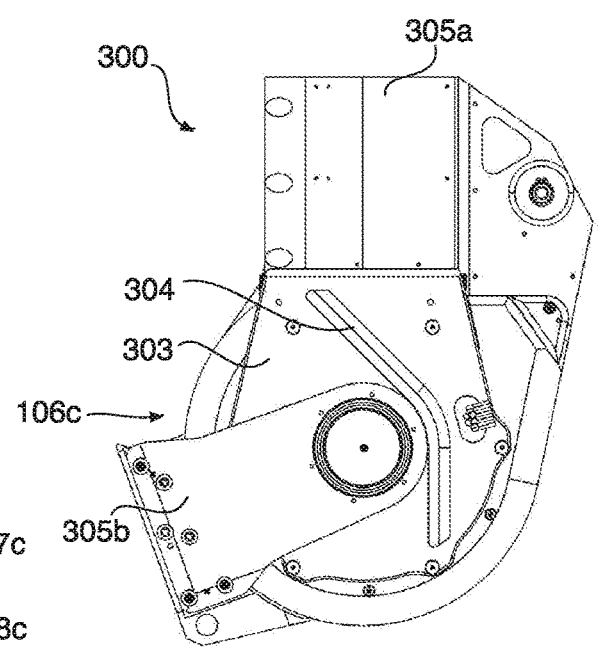
FIG. 2B is a side view of the robotic joint system of FIG. 2A, with the support members shown in an intermediate position.
Figure 2C:
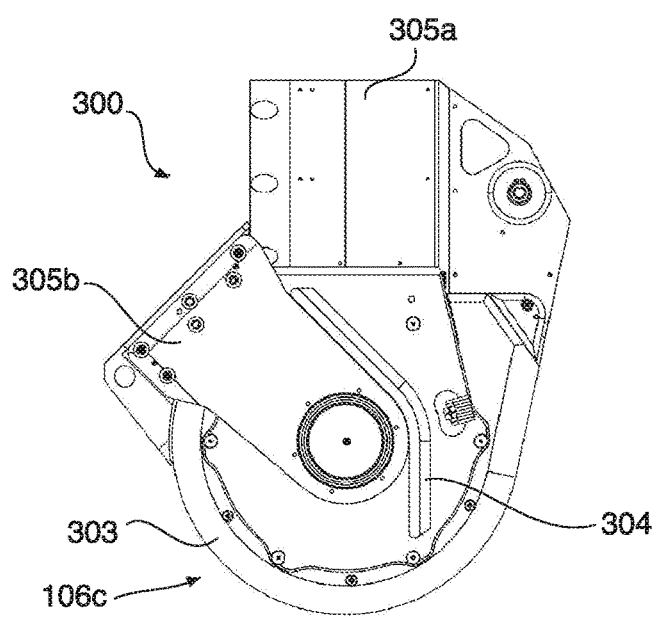
FIG. 2C is a side view of the robotic joint system of FIG. 2A, with the support members shown in a flexed position.
Figure 3A:
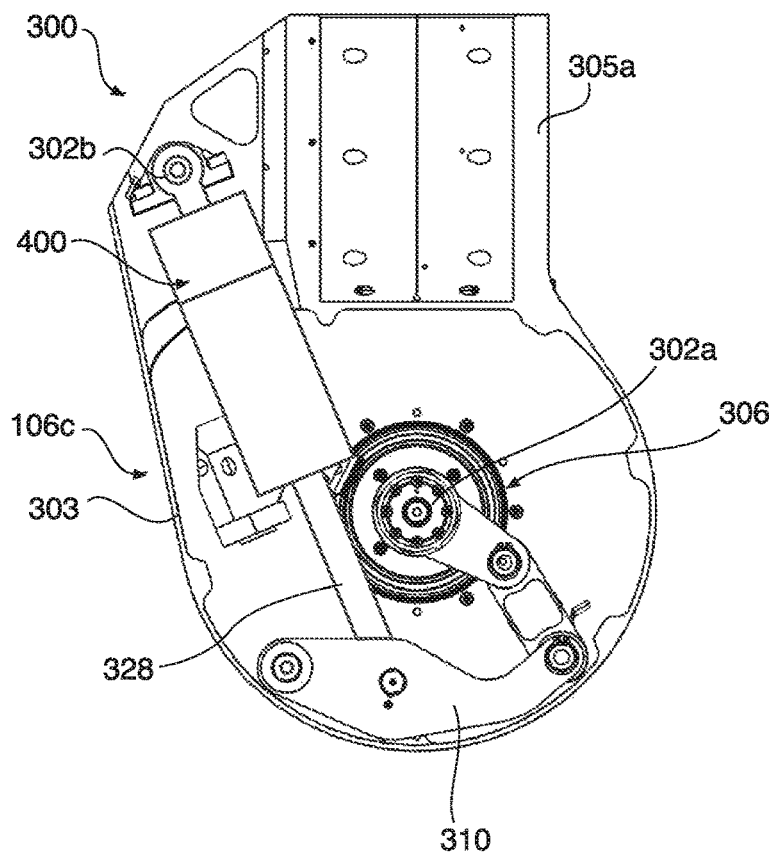
FIG. 3A illustrates a side view of the robotic joint system of FIG. 2A with a panel of the housing removed to show internal features and components of the robotic joint system, the robotic joint system being shown in an extended position.
Figure 3B:
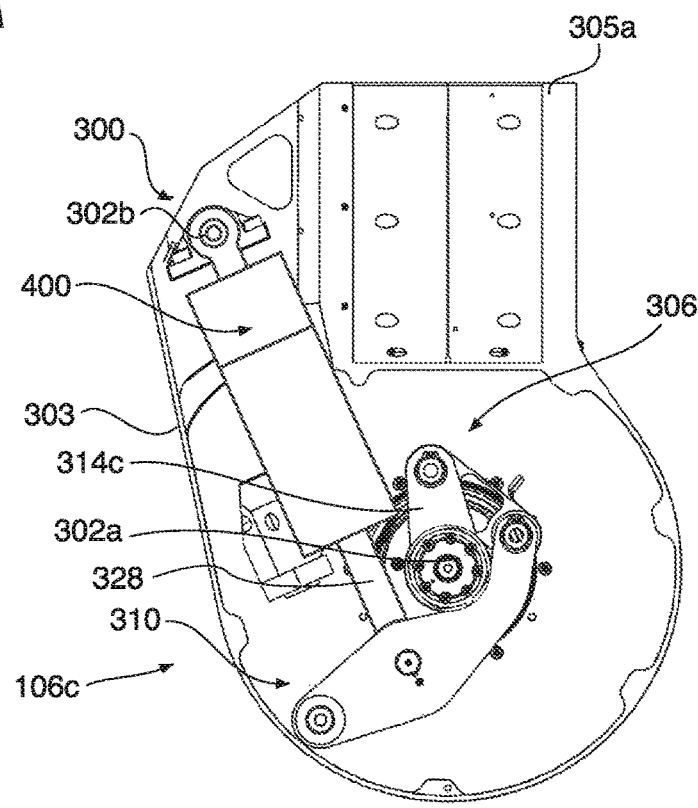
FIG. 3B illustrates a side view of the robotic joint system of FIG. 2A with a panel of the housing removed to show internal features and components of the robotic joint system, the robotic joint system being shown in a retracted position.

FIGS. 2A-2C illustrate side views of a joint system 300 comprising the first and second support members 305a and 305b and the actuator joint assembly 106c of the robotic system 100 of FIGS. 1A and 1B, in various rotational positions or orientations. FIGS. 3A and 3B illustrate side views of the joint system 300 of FIGS. 2A-2C with a panel of the housing removed to show internal features of the actuator joint assembly 106c. With reference to FIGS. 1A-3B, the joint system 300 can comprise the actuator joint assembly 106c and first and second support members 305a and 305b connected to the actuator joint assembly 106c. The support members 305a and 305b rotate relative to one another about the axis of rotation 108c via the joint 107c. The actuator joint assembly 106c can be incorporated into a robotic or robot limb, such as into the lower right limb of the exoskeleton type robotic system 100 (see FIGS. 1A and 1B) at the knee joint 107c. However, the actuator joint assembly 106c, as discussed herein, provides one example of an actuator joint assembly that can be used at any of the joints of the robotic exoskeleton 100. Generally speaking, an actuator joint assembly configured in accordance with the disclosure herein can facilitate movement of the robotic system in a degree of freedom, namely rotation between rotatably coupled support members of a robot or robotic system that are operable with the actuator joint assembly at a joint between the support members. Any of the actuator joint assemblies herein can include various linkages, connectors and/or actuators to enable the actuator joint assembly to facilitate a desired movement between the rotatably coupled support members of the joint system.

The example joint system 300 with its actuator joint assembly 106c can comprise and be disposed at the knee joint 107c facilitating a flexion/extension degree of freedom in the robotic system 100 corresponding to a knee flexion/extension degree of freedom of a human, as discussed above. The joint assembly 106c can facilitate rotation at the knee joint 107c about an axis of rotation 108c. The actuator joint assembly 106c can further comprise a primary actuator 306 operable to apply a primary torque to cause rotation between the support members 305a, 305b connected at the joint 107c and thus flexion/extension in the limb 102 via the joint 107c.

The joint system 300 can further comprise a first support member 305a and a second support member 305b operable with the actuator joint assembly 106c to be connected at the joint 107c, wherein the first and second support members 305a and 305b and the actuator joint assembly 106c are configured, such that the first and second support members 305a and 305b are able to rotate relative to one another about the axis of rotation 108c to facilitate the flex/extend motion of the joint 107c. The first support member 305a can comprise a rigid limb component that can be configured in any number of ways as will be apparent to those skilled in the art. The second support member 305b can also comprise a rigid limb component that can be configured in any number of ways as will be apparent to those skilled in the art, wherein these are configured to be rotatable relative to one another about the associated joint 107c. The joint assembly 106c can facilitate movement between the first support member 305a and the second support member 305b in a flex/extend motion at the joint 107c about the axis of rotation 108c. In the example shown, the joint assembly 106c can rotate the second support member 305b relative to the first support member 305a from a fully extended position, as shown in FIG. 2A, to an intermediate position, as shown in FIG. 2B, to a fully flexed position, as shown in FIG. 2C.

The actuator joint assembly 106c can comprise an output member 302a (see FIGS. 3A and 3B) and an input member 302b that are operable with the second support member 305b and the first support member 305a, respectively, and that can facilitate rotation of the first support member 305a relative to the second support member 305b about the axis of rotation 108c (i.e. can facilitate rotation at the joint 107c between the first and second support members 305a, 305b about the axis of rotation 108c). The output member 302a can be part of or coupled to the primary actuator 306 (which in this example, comprises an electric motor having an output shaft, but in another example can comprise a motor and one or more transmissions, in which the output member 302a can be coupled to the one or more transmissions). The output member 302a can further be coupled to the second support member 305b. The input member 302b can comprise the coupling of a passive actuation system 400 (discussed in more detail below) to the first support member 305a using various coupling components (e.g., a pin on the first support member 305a that extends through an aperture in the passive actuation system 400, and that is secured using a bearing). The input member 302b can be part of or coupled to the first support member 305a, wherein the first and second support members 305a and 305b are rotatable relative to one another via the input and output members 302b and 302a, respectively.

The actuator joint assembly 106c can comprise a primary actuator 306 (e.g., an electric motor, electromagnetic motor, or others as will be apparent to those skilled in the art) operable to apply a primary torque to rotate the first and second support members 305a and 305b relative to one another. In this example, the primary actuator 306 comprises an electric motor that operates to apply the primary torque to the output member 302a, and the second support member 305b coupled thereto, to cause the second support member 305b to rotate relative to the first support member 305a about the axis of rotation 108c. The primary actuator 306 can be selectively controlled, or in other words, selectively energized, and therefore, the primary torque applied to rotate the first and second support members 305a and 305b can be selectively controlled. Selective control of the primary actuator 306 can include, but is not limited to, control of the timing of the energizing of the primary actuator 306 (i.e., when the primary actuator 306 is turned on and off), the duration of the energization of the primary actuator 306 (i.e., how long the primary actuator 306 is on or off), as well as the magnitude of the energy output and/or torque applied by the primary actuator 306 (i.e., the level of power output and/or torque applied by the primary actuator 306). An example of a primary actuator including a motor and a planetary transmission is more fully explained in U.S. Pat. No. 10,765,537, the contents of which are incorporated by reference in their entirety.

As indicated above, the actuator joint assembly 106c can further comprise a passive or a quasi-passive actuator operable to store energy and release energy into the joint system 300 via the tunable actuator joint assembly 106c. In the example shown, the actuator joint assembly can comprise a passive actuation system 400 that comprises a passive or quasi-passive actuator 450 that operates in parallel with the primary actuator 306, and a length adapter 410 (discussed below). The passive actuation system 400 can be controlled and operable to store energy upon a first rotation or movement of the input member 302b and the first support member 305a relative to the output member 302a and the second support member 305b, and to release energy, such as upon a second rotation of the first member 305a relative to the second member 305b to apply a torque sufficient to cause rotation of the joint system 300. The torque from the passive actuation system 400 can be combined with the torque from the primary actuator 306 to assist rotation of the output member 302a.

In some examples, the torque from the passive actuation system 400 can be utilized to minimize power consumption of the primary actuator 306 (thus leading to the ability to select a smaller, less powerful motor than might otherwise be needed without the existence of a passive or quasi-passive actuator). For example, the passive actuation system 400 can be utilized to store energy in the event where the joint 107c is subject to forces that cause the first and second support members 305a and 305b to rotate relative to one another in a first direction (e.g. an applied torque from the primary actuator 306, weight of components of the joint system 300 and exoskeleton, weight from a load carried by the exoskeleton, or others), and can be utilized to release energy and provide a torque to help rotate the first and second support members 305a and 305b in a second direction.

The actuator joint assembly 106c can comprise a housing 303 in which the components of the joint assembly 106c are disposed. In some examples, the housing 303 can comprise one or more stopper protrusions supported on the housing 303, and which serve to mechanically limit the rotation of the second support member 305b relative to the first support member 305a in one or both rotational directions. In the example shown, the one or more stopper protrusions comprises an elongated stopper protrusion 304 that extends along a panel of the housing 303 in different directions, and that is strategically configured and positioned on the housing 303 to prevent relative rotation of the first and second support members 305a and 305b within the joint system 300 in both directions beyond a given angular rotation. The functionality of the stopper protrusions is shown in FIGS. 2A and 2C, wherein the second support member 305b is engaged with different portions of the stopper protrusion 304 to stop or limit further rotation of the second support member 305b relative to the first support member 305b at different angular positions of the second support member 305b relative to the first support member 305a.

The housing 303 can facilitate a coupling or connection between the tunable actuator joint assembly 106c and the first and second support members 305a, 305b. In this example, the housing 303 can be fixedly attached to the first support member 305a and can be rotatably coupled to the second support member 305b. Accordingly, the input member 302b can be fixed to the housing 303, and therefore the first support member 305a, such as via a pinned connection.

The output member 302a can be connected to the housing 303 to allow for relative rotation of the output member 302a (e.g. via bearings) and the housing 303 and can be fixedly coupled to the second support member 305b. Of course, the configuration is not intended to be limiting, and other configurations and connections are also possible.

The output member 302a can be driven by the primary actuator 306 to cause rotation of the second support member 305b relative to the first support member 305a via the joint 107c. In one example, the primary actuator 306 can comprise a motor. In another example, the primary actuator 306 can comprise a motor and a transmission. In another example, the primary actuator 306 can comprise a motor, a transmission, and one or more linkages to connect to and drive the output member 302a with a mechanical advantage. An example of a primary actuator including a motor and a planetary transmission is more fully explained in U.S. Pat. No. 10,765,537, the contents of which are incorporated by reference in their entirety.

In the example shown, the output member 302a can be in line with the primary actuator 306. That is, the output member 302a and the primary actuator 306 can be oriented and arranged along and can rotate about the same axis of rotation 108c (i.e., their rotational axes are collinear), which axis of rotation 108c is also the axis of rotation between the first and second support members 305a, 305b. This allows the packaging of the joint assembly 106c to be compact and reduces the need for torque transfer devices such as belts, pulleys, gears etc., further reducing complexity of the joint assembly 106c. However, this is not intended to be limiting in any way as it is contemplated that, in some examples, the primary actuator 306 can be offset from the axis of rotation 108c and operable to rotate the first and second support members 305a, 305b via one or more torque transfer devices.

The passive actuation system 400 can be coupled to the input member 302b at a first end of the passive actuation system 400. A second end of the passive actuation system 400 can couple to the output member 302a via a linkage 310. Thus, the passive actuation system 400 can be considered to be indirectly coupled to the first and second support members 305a, 305b as the connection to the first support member 305a is through the input member 302b, and the connection to the second support member 305b is through the output member 302a via the linkage 310. In another example, the passive actuation system 400 can be directly coupled to one or both of the first and second support members 305a, 305b, to one or more components associated therewith (e.g., the housing 303 in this example). No matter the configuration of the passive actuation system 400, the first and second support members 305a, 305b (or any components associated therewith), and/or any linkage operable therewith, the passive actuation system 400 is intended to be coupled "between" the first and second support member 305a, 305b, meaning that the passive actuation system 400 is positioned and suitably coupled within the tunable actuator joint assembly 106c, such that the passive actuation system can store energy upon rotation of the first and second support members 305a, 305b, or such that actuation of the passive actuation system 400 results in a torque applied to the actuator joint assembly 106c (e.g., a restoring torque, an augmented torque, etc.). As shown in FIGS. 3A and 3B, the linkage 310, and thus the output member 302a, can move or displace from where a piston rod of the passive actuation system 400 is in an extended position shown in FIG. 3A (which can correspond with an extended position of the tunable actuator joint assembly 106c as shown in FIG. 2A)

to where the piston rod of the passive actuation system 400 is in a retracted position shown in FIG. 3B (which can correspond with a flexed position of the tunable actuator joint assembly 106c as shown in FIG. 2C). In this manner, the passive actuation system 400 can be configured to store energy upon a first rotation of the support members 305a, 305b at the joint 107c (e.g. when the actuator joint assembly 106c moves from an extended position to a flexed position and the linkage 310 and piston rod 328 move from an extended position to a retracted position) and can release energy upon a second rotation of the support members 305a, 305b (e.g. when the actuator joint assembly 106c moves from the flexed position to the extended position and the linkage 310 and piston rod 328 move or displace from the retracted position to the extended position).

Figure 4:
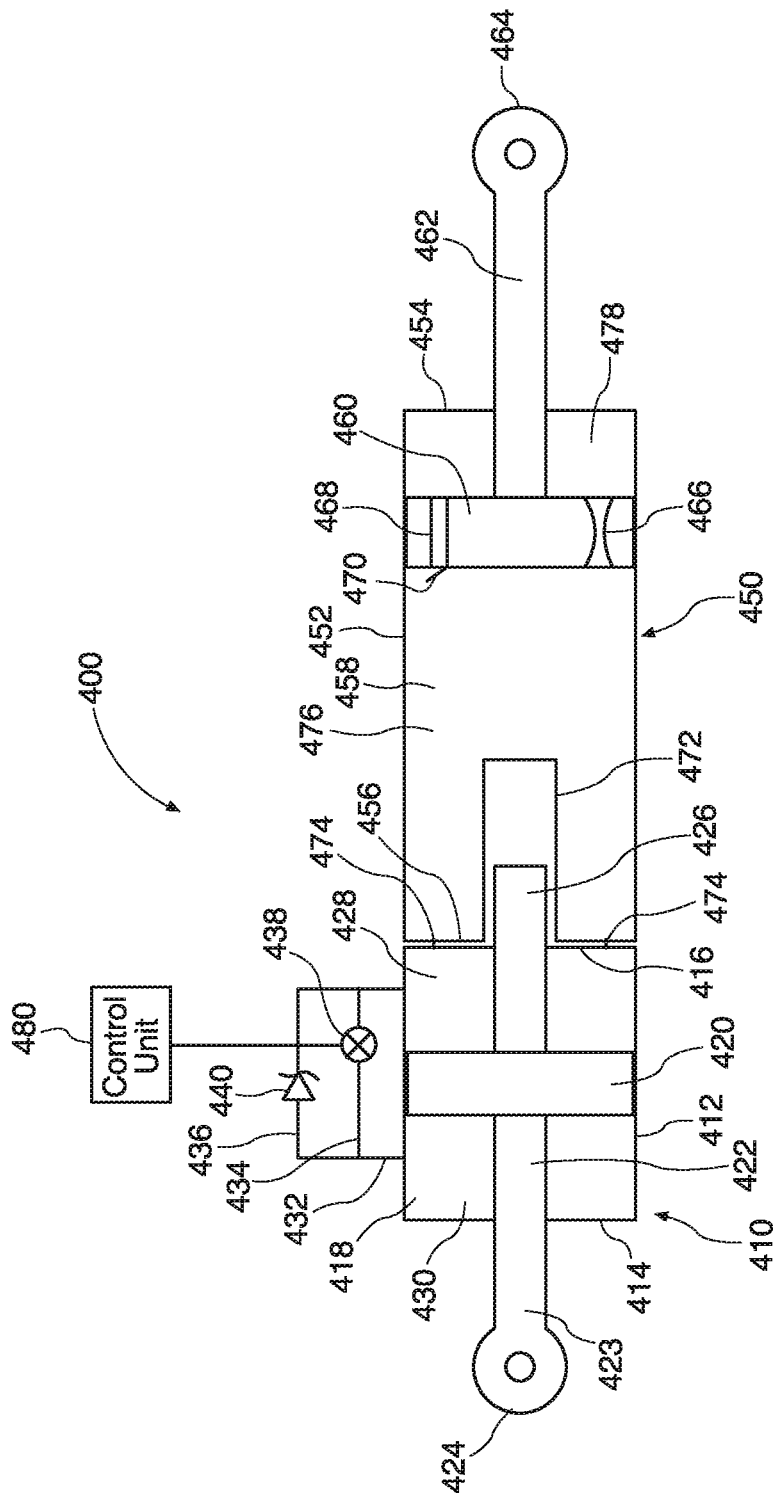
FIG. 4 illustrates a schematic view of a passive actuation system of the robotic joint system according to one example of the present disclosure.

As mentioned above, the passive actuation system 400 of the actuator joint assembly 106c can comprise a passive or a quasi-passive actuator. The passive or quasi-passive actuator can be formed to comprise or can be coupled with a length adapter, as discussed herein. The passive actuation system 400 can thus be defined by the combination of a passive or quasi-passive actuator and a length adapter. FIG. 4 shows a schematic view of a passive actuation system 400 according to one example of the present disclosure. With reference to FIGS. 1-4, the passive actuation system 400 can comprise a length adapter 410 and a passive actuator 450. In one example, the passive actuator 450 can comprise a single state air spring (i.e., an air spring that is continuously active). However, this is not intended to be limiting as the actuation system 400 could have other configurations, such as the passive actuator 450 comprising a multi-state quasi-passive actuator. It is noted that while FIGS. 3A and 3B show the passive actuation system 400 oriented such that the length adapter 410 is connected to the output member 302 and the passive actuator 450 can be connected to the linkage 310, the passive actuation system could be reversed such that the length adapter is connected to the linkage 310 and the passive actuator 410 is connected to the output member 302b.

The passive actuator 450 can comprise a passive linear pneumatic actuator or air spring. The passive linear pneumatic actuator can be configured in a variety of ways, or comprise a variety of different types. In one example, the passive actuator 450 can be operable to store energy upon a first rotation of the first and second support members 305a, 305b relative to one another, or upon the first rotation of the output member 302a relative to the input member 302b of the actuator joint assembly 106c (see FIGS. 2A-3B) and to release energy upon a second rotation of the output member 302a relative to the input member 302b, which rotation is in an opposing direction as the first rotation. For instance, the passive actuator 450 can be configured to provide a compensating force or torque that works against a gravitational force acting on the joint system 300, such as resulting from the weight of a robotic system 100 (see FIGS. 1A and 1B), including any weight of a load carried by the robotic system 100. The passive actuator 450 can comprise a housing 452, such as a cylindrical housing, having a first end 454 and a second end 456. The housing 452 can be coupled to the length adapter 410 at the second end 456. The housing 452 can define an internal piston chamber 458 that accommodates a piston 460 that can move (i.e., the piston 460 can displace) linearly within the chamber 458. A piston rod 462, or a portion of a piston rod 462, can extend from one side of the piston 460 and can extend through the first end 454 of the housing 452. The piston rod 462 can comprise a distal end 464 that can connect to a joint assembly (e.g., the linkage 310, which is coupled to the output 302a of the joint assembly 106c), such that when the output member 302a rotates relative to the input member 302b, the piston rod 462 moves in or out of the first end 454 of the housing 452.

When the piston rod 462 moves or displaces in or out of the first end 454 of the housing 452, the passive actuator 450 can store energy from, and release energy to, respectively, the actuator joint assembly 106c. For example, when the piston rod 462 moves into the housing 452, the piston 460 moves from the first end 454 towards the second end 456 of the housing 452. The piston 460 divides the internal piston housing 458 into a compression chamber 476 and an expansion chamber 478. As the piston 460 moves towards the second end 456 of the housing 450, energy can be stored in the compression chamber 476 as the piston 460 compresses the gas in the compression chamber 476. Energy can be released from the compression chamber 476 as the compressed gas forces the piston 460 to move from the second end 456 towards the first end 454 of the housing 452. The piston rod 462 connected to the piston 460 can move out of the housing 452, thereby applying a force or torque to the actuator joint assembly 106c.

In some examples, the passive actuator 450 can comprise an orifice 466 configured and operable to connect the compression chamber 476 and the expansion chamber 478 and to allow fluid to pass therethrough. In one example, the orifice 466 can be configured to facilitate a limit on the fluid flow velocity, or in other words, to provide or facilitate choked flow of the fluid from the compression chamber 476 to the expansion chamber 478 upon movement of the piston at a speed greater than a threshold velocity dependent upon given design parameters. In the example shown, the passive actuator 450 comprises a small orifice in the form of a choked flow orifice 466 extending from and joining the compression chamber 476 and the expansion chamber 478. The choked flow orifice 466 comprises an internal wall structure defining a passageway or opening. In one example, as shown, the choked flow orifice 466 can comprise a passageway or opening that varies in diameter from one side of the piston 460 to the other (e.g., the opening can have a hyperbolic configuration). The choked flow orifice 466 in this example is shown to extend through the piston 460 to connect the compression chamber 476 and the expansion chamber 478. The choked flow orifice 466 can be configured to facilitate a desired flow rate of gas from the compression chamber 476 to the expansion chamber 478. By utilizing the choked flow orifice 466, the passive actuator 450 can effectively have a different stiffness during different operations. For example, during an operation where a torque is quickly or suddenly applied to the joint assembly 106c, such as a heel strike followed by a leg single support portion of a walking or a running gait cycle, the passive actuator 450 can have a relatively high stiffness as compared to when a torque is more gradually applied to the joint assembly 106c, such as during a squatting motion. When a torque is quickly applied to the joint assembly 106c, and thus to the passive actuator 450, the piston 460 quickly compresses gas within the compression chamber 476. Because the choked flow orifice 466 limits the flow rate between the compression chamber 476 and the expansion chamber 478, the actuator 450 behaves almost as if the choked flow orifice 466 was not present when the piston 460 compresses gas within the compression chamber 476. Conversely, when a torque is gradually applied to the actuator joint assembly 106c, and thus the passive actuator 450, the piston 460 moves more slowly or at a slower rate through the internal piston chamber 458 of the housing 452. This allows more gas to transfer from the compression chamber 476 to the expansion chamber 478 through the choked flow orifice 466 while the piston 460 compresses gas in the compression chamber 476. Due to the configuration of the choked flow orifice 466 and the transfer of gas from the compression chamber 476 to the expansion chamber 478, the stiffness of the passive actuator 450, and the torque it contributes to the joint 106c, is lower during a slow and gradual movement of the joint assembly 106c as compared to a quick or sudden movement of joint assembly. Thus, the passive actuator 450 can be effective to provide different force/torque contributions for sudden movements which are accompanied by a sudden application of torque by the air spring and length adapter and for gradual movements which are accompanied by the gradual applications of torque to the actuator joint assembly 106c. The choked flow orifice 466 can be configured in any number of different ways, including, but not limited to, size, shape, length, rate of change of the orifice walls, and others.

The passive actuator 450 can further comprise a second passageway 468 connecting the compression chamber 476 and the expansion chamber 478. The second passageway 468 can be formed through the piston 460 as shown in FIG. 4. In other examples, the second passageway 468 could have other configurations, such as a passageway that extends outside the internal piston chamber 458 of the housing 452. The second passageway 468 can comprise a one-way valve 470. The one-way valve 470 can be configured to allow gas to travel in a single direction through the second passageway 468. In this example, the one-way valve 470 is configured to allow gas to travel only from the expansion chamber 478 to the compression chamber. In this manner, when the piston 460 displaces or is moved towards the first end 456 to compress gas in the compression chamber 476 (i.e. the pressure within the compression chamber 476 is greater than the pressure within the expansion chamber 478), no gas is permitted to travel through the gas passageway by the one-way valve 470. Conversely, when the piston 460 displaces or is moved towards the second end 454 and when pressure in the expansion chamber 478 is greater than pressure in the compression chamber 478, the one-way valve 470 allows gas to travel from the expansion chamber 478 to the compression chamber 476. This configuration can ensure that the passive actuator 450 can always be easily extended without substantial resistance, even when pressure has begun to equalize between the compression chamber 476 and the expansion chamber 478 through the chocked flow orifice 466. For example, if a user of a robotic system 100 of an exoskeleton (such as shown in FIGS. 1A and 1B) were to move the actuator joint assembly 106c from a flexed position (such as shown in FIG. 2C) to an extended position (such as shown in FIG. 2A) via the user's own strength and/or a primary actuator, the one-way valve 470 on the passive actuator 450 can ensure that the passive actuator 450 does not resist the extension of the actuator joint assembly 106c as the piston rod 464 extends outward from the housing 452 as the actuator joint assembly 106c extends.

As mentioned above, the passive actuation system 400 can also comprise a length adapter 410 coupled in series to the passive actuator 450. As discussed to herein, the term "length adapter" refers to a mechanism or device capable of selectively directing the output of the stored energy of the passive actuator to which it is connected. The length adapter can be capable of an adjustable length between different connection points of the length adapter so as to accommodate movements of members connected to the length adapter (e.g., movements of a robotic structural support member relative to another structural support member about a joint, as well as movements of the passive actuator coupled to the length adapter). A "length adapter," as discussed herein, can comprise two operating states, namely an adjustable operating state where the length adapter is capable of moving in one or more ways to achieve an adjustable length, and a rigid operating state where the length adapter models a rigid rod and maintains a fixed length. The length adapter 410 can thus be configured to accommodate an overall length of the passive actuation system 400 to selectively direct the output of the stored energy of the passive actuator 450 depending upon which operating state it is caused to be placed in in real-time, as will be described in more detail below. The length adapter 410 can be a mechanical, an electromechanical, or hydraulic mechanism or device that selectively directs the output of the stored energy of the passive actuator 450 in real-time during operation of the robotic system 100.

In the example shown in FIG. 4, the length adapter 410 can be a hydraulic device that comprises a piston housing 412, such as a hydraulic cylinder, having a first end 414 and a second end 416 opposite the first end 414. The length adapter 410 can comprise an internal piston chamber 418 within the housing 412. The internal piston chamber 418 can accommodate a piston 420 that is configured and operable to move (i.e., the piston displaces) linearly bi-directionally within the internal piston chamber 418. A piston rod 422 can be attached to, formed with, or otherwise operable with the piston 420. The piston rod 422 can comprise a first portion 423 having a distal end 424 that can connect to a joint assembly (e.g., the first portion 423 can connect to input 302b of the joint assembly 106c of FIGS. 2A-3B) of a joint system (e.g., joint system 300 of FIGS. 2A-3B) of a robotic system (e.g., see robotic system 100 of FIGS. 1A and 1B. The piston rod 422 can extend from the piston 420 through the first end 414 of the housing 412, such that the first portion 423 is located outside the housing 412. The piston rod 422 can further comprise a second portion 426 having a proximal end 425. The piston rod 422 can extend from the piston 420 through the second end 414 of the housing 412, such that the second portion 426 is located outside housing 412.

The piston 420 can divide the internal piston chamber 418 into a first chamber 428 and a second chamber 430. Both of the first and second chambers 428, 430 can be filled with an incompressible fluid. While the term incompressible fluid is used herein, it is of course understood by one of ordinary skill that an incompressible fluid is a concept of an idealized fluid for which the density does not change at all with variations in pressure. In reality, all fluids are compressible to at least to some extent. Thus, for the purposes discussed herein, an incompressible fluid is a fluid that behaves substantially as an incompressible fluid, such as liquid water, hydraulic oil, or the like. The first chamber 428 can be connected to the second chamber 430 via a passageway 432. The passageway 432, as shown in FIG. 4, can be configured to extend outside the housing 412. However, in another example, the passageway 432 could be configured to extend within the housing 412 or be internal within the housing 412, such as within a wall of the housing 412 or through the piston 420.

The passageway 432 can subdivide into a first branch 434 and a second branch 436. The first branch 434 can comprise a valve 438 that can be selectively opened and closed to selectively allow the incompressible fluid to flow between the first chamber 428 and the second chamber 430. When the valve 438 is open or at least partially open to place the length adapter 410 in the adjustable operating state, such that fluid is flowable between the first chamber 428 and the second chamber 430, the piston 420 can move bi-directionally linearly within the internal piston chamber 418. That is, the piston 420 can move towards the first end 414 and away from the second end 416 or the piston 420 can move towards the second end 416 and away from the first end 414 when the valve 438 is open, or at least partially open. When the valve 438 is closed to place the length adapter 410 in the rigid operating state, fluid is not free to flow between the first chamber 428 and the second chamber 430. Because the fluid in the first and second chambers 428, 430 is an incompressible fluid, the piston 420 does not move or displace within the internal piston chamber 418 when the valve 438 is closed. Thus, when the valve 438 is closed, the length adapter 410 can act essentially as a rigid member (i.e., model a rigid rod). The valve 438 can comprise any suitable type of valve such as an electrically or pneumatically actuated valve, a piezo electric valve, a check valve, or another type of valve as will be recognized by those skilled in the art.

The second branch 436 of the passageway 432 can comprise a one-way valve 440. The one-way valve 440 can allow for fluid to flow only from the second chamber 430 to the first chamber 428. This allows the piston 420 to move towards the first end 414 in the internal piston chamber 418, but does not allow the piston 420 to move towards the second end 416. In this way, the length adapter 410 is allowed to expand or lengthen (i.e. the first portion 423 of the piston rod 422 can move out of the first end 414 of the housing 412 to increase the overall length of the length adapter 410) even when the valve 438 is closed. However, the one-way valve 440 ensures that the length adapter cannot compress (i.e. the piston 420 cannot move towards the second end 416 of the housing 412; and the piston rod 422 and the first portion 423 of the piston rod 422 cannot retract into the first end 414 of the housing 412 towards the second end 416 to reduce the overall length of the length adapter 410) when the valve 438 is closed. The one-way valve 440 could further be equipped with an overpressure relief valve with a burst pressure set at a value that is well above a normal pressure anticipated to be achieved in the passive actuator 450 and/or the length adapter 410, but that is also low enough to protect the passive actuation system 400. It is noted that this configuration is not intended to be limiting. For example, instead of the passageway 432 comprising a first branch 434 and a second branch 436, two separate passageways (e.g., see separate branch for the one-way valve 440 as represented by the dotted lines, which can be separate from the branch for the valve 438) could be utilized for each of the valve 438 and one-way valve 440. In some configurations, the second branch 436 and the one-way valve 440 can be omitted.

The length adapter 410 can comprise a rigid member coupled to the passive actuator 450. In the example shown, the length adapter 410 can comprise a rigid member in the form of the piston housing 412 coupled to the housing 452 of the passive actuator 450. The length adapter 410, namely its housing 412, can be securely and rigidly fastened to the housing 452 of the passive actuator 450, such as via fasteners 474 attaching the second end 416 of the housing 412 of the length adapter 410 to the second end 456 of the housing 452 of the passive actuator 450. Other fastening mechanisms could be used such as adhesives, welding, or other joining operations/methods. The passive actuation system 400 could also be constructed as a unitary body where the length adapter 410 and the passive actuator 450 are built as a single unitary structure. The passive actuator 450 can comprise a blind bore 472 in the second end 456 of the housing 452. The blind bore 472 can sized and configured to receive therein and accommodate travel of at least a portion of the piston rod 422, namely the second portion 426 of the piston rod 422 of the length adapter 410. In another example, wherein the blind bore 472 could be eliminated, the passive actuator 450 can be attached to the length adapter 410 with a gap or space between them that is sufficient to accommodate the travel of the piston rod 422 of the length adapter 410.

As mentioned above, the length adapter 410 can be configured to accommodate an overall length of the passive actuation system 400 to selectively direct the output of the stored energy of the passive actuator 450. This can be done by selectively opening and closing the valve 438. With passive actuator 450 in the active state, such as to provide a gravity compensation function, and with the gas in the compression chamber 476 compressed, and with the valve 438 of the length adapter 410 in the closed position, when the compressed gas in the compression chamber 476 of the passive actuator 450 acts against the piston 460 of the passive actuator 450 to apply a force on the piston rod 462, the length adapter 410 acts essentially as a rigid member (i.e., models a rigid member) because the valve 438 prevents the length adapter 410 from compressing or substantially compressing (i.e. the valve 438 prevents fluid from moving from the first chamber 428 to the second chamber 418 and the piston 420 from moving towards the second end 416). Thus, the passive actuator 450 can apply a force or torque to the joint assembly (e.g., joint assembly 106c (see FIGS. 2A-2C)) in the same manner as if the length adapter 410 was not present or was a rigid member. In other words, length adapter 410 in the rigid state can simply transfer the energy from the passive actuator 450 to the actuator joint assembly 106c. Indeed, the passive actuator 450 can apply a force or torque to the joint assembly as the piston 460 is caused to move or displace the piston rod 462 outward, with the portion 464 of the piston rod 460 being coupled to the output of the joint assembly (e.g., via the piston rod 460 being coupled to the linkage 310, which is coupled to the output 302a of the joint assembly 106c), and the first portion 423 of the piston rod 422 of the length adapter 410 being coupled to the input member of the joint assembly (e.g., the first portion 423 can connect to input 302b of the joint assembly 106c of FIGS. 2A-3B). In other words, the piston rods 422 and 462 can be coupled to various parts of the joint assembly to facilitate the functionality of the passive actuation system 400 described herein.

With the valve 438 in the open position, the piston 420 of the length adapter 410 is operable to move (i.e., displace) linearly bi-directionally within the internal piston chamber 418. Thus, when the compressed gas in the compression chamber 476 of the passive actuator 450 acts against the piston 460 of the passive actuator 450 to apply a force on the piston 460 and the piston rod 462 of the passive actuator 450 to move the piston 460 in the direction towards the first end 454, the piston 420 of the length adapter 410 is operable to displace or move, such as to move within the internal piston chamber 418 towards the second end 416 of the housing 412. In this manner, the energy from the passive actuator 450 can be diverted to and absorbed by the length adapter 410. In other words, instead of the energy stored in the passive actuator 450 applying a force or torque on the actuator joint assembly 106c, the length adapter 410 accommodates the change in length of the passive actuator 450 as the piston 460 of the passive actuator 450 is pushed towards the first end 454 of the housing 452 of the passive actuator 450, and as the piston rod 462 is pushed out of the first end 454 of the housing 452 of the passive actuator 450. This change in length is accommodated by open valve 438 allowing the piston 420 of the length adapter 410 to move (i.e., displace) towards the second end 416 of the housing 412 of the length adapter 410, and the piston rod 422 of the length adapter 410 to retract into the first side 414 of the housing 412 of the length adapter 410 as the piston 420 moves towards the second end 416 of the housing 412 of the length adapter 410. In this manner, an overall length of the passive actuation system 400 is maintained from and during the time the valve 438 is opened even as compressed gas in compression chamber 476 of the passive actuator 450 pushes the piston 460 of the passive actuator 450 towards the first end 454 of the housing 452 of the passive actuator 450, forcing the piston 462 to extend out of the first end 454 of the housing 452. Thus, the energy in the passive actuator 450 is absorbed by or transferred to the length adapter 410 as kinetic energy and is not transferred to the actuator joint assembly 106c while the overall length of the passive actuation system 400 is maintained. It is noted that rotation of the joint assembly during use can cause the overall length of the of the joint assembly to change, and thus the passive actuation system 400 can absorb a fraction of the energy and can perform some work to brake (i.e. slow down the joint assembly) and/or do positive work on the joint assembly due to the change of length in the passive actuation system 400. In other words, the passive actuator 450 is not able to apply an energy recovering torque that would otherwise cause rotation of the actuator joint assembly 106c (or is at least prevented from applying most of the energy recovering torque as there will still be some resistance as a result of friction between the piston 420 and piston rods 422 and 426 with the walls of the housing 412 and as a result of fluid flow through the valve 438). It is further noted that residual friction associated with the fluid flow in the hydraulic passive actuator 450, as well as any seals present in the passive actuator 450, will still allow the passive actuator 450 to contribute a negligible amount to the joint torque even when the length adapter 410 is in its movable state.

By selectively diverting the energy from the passive actuator 450 to be absorbed at least in part into and by the length adapter 410, the passive actuation system 400 can essentially be "turned off" at a desired time by selectively opening and closing the valve 438 of the length adapter 410, even if the passive actuator 450 still has energy stored in its compression chamber 476. In other words, if during a movement cycle of the actuator joint assembly 106c no further force or torque is desirable from the passive actuation system 400, the valve 438 can be opened and remaining energy stored in the passive actuator 450 can be substantially diverted to and adsorbed by the length adapter 410. Such control can be beneficial for an actuator joint assembly at a knee joint (such as knee joint 107c) during a walking or a running movement cycle of a robotic system, as will be described below.

The passive actuation system 400 can comprise a control unit 480 that is connected to the passive actuation system 400 and is operable and configured to control the passive actuation system 400. The control unit 480 can be any suitable controller and can comprise a power source, one or more processors, a memory, input/output devices, and the like. The control unit 480 can be operable to control the valve 438 to selectively divert energy from the passive actuator 450 to the length adapter 410 as discussed herein.

An example of using the passive actuation system 400 during a walking gait of a robotic system will now be discussed with reference to FIGS. 1-5D. FIGS. 5A-5D show a schematic view of a robotic limb and an exemplary corresponding position and configuration of a passive actuation system according to the present disclosure. Generally, during a walking gait or running gait, a joint system such as a joint system at a knee joint 107c of a robotic limb experiences very little load or applied torque to the joint system from external forces during a free swing portion of the walking or running gait (i.e. when the robotic limb does not contact the ground). However, at a heel strike portion of the walking or running gait, the joint system immediately experiences a very large amount of load or applied torque to the joint system due to the weight of the robotic system 100 suddenly acting on the knee joint 107c and the forces from the ground being transferred into the joint system. Thus, the joint system almost instantaneously transitions from no load to some magnitude of load from the moment of heel strike to the end of the double and/or single leg support portion of the walking gait cycle at toe-off. The passive actuation system 400 can be configured to accommodate both a free swing portion of the walking gait from toe-off to heel strike as well as a loaded portion of the walking gait from heel strike to toe-off.

Figure 5A:
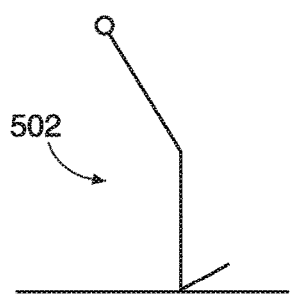
FIG. 5A to FIG. 5D illustrate schematic views of a robotic limb and an exemplary corresponding position and configuration of the passive actuation system shown in FIG. 4.
Figure 5A:
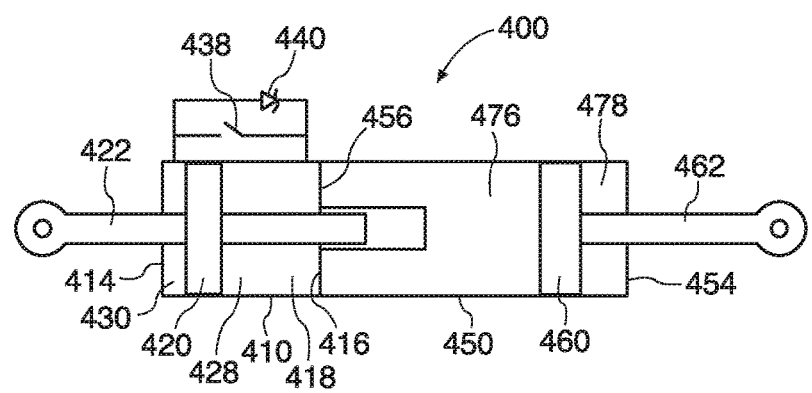

In FIG. 5A, a robotic limb 502 (which can represent any of the lower legs or limbs of the robotic system 100, or any other gait-capable robot system) is shown schematically at the moment of heel strike during a walking gait. For instance, the robotic limb 502 can be similar to the robotic limb 102 discussed above. At heel strike, a load applied to the joint system (such as joint system 300) rapidly goes from substantially zero to some magnitude of a load, which, in some cases, can be a maximum load (i.e., the highest magnitude of torque that is experienced by the robot during the gait cycle). Accordingly, the passive actuation system 400 can be caused and selectively operated to be in a stiff configuration or a rigid state to cause the passive actuator 450 to apply a torque at the joint system to counter the applied load at heel strike. The torque applied by the passive actuation system 400 can be a reactive force that generates torque that it is applied in combination with a primary torque applied by a primary actuator, such as an electric motor, of the actuator joint assembly. As such, as shown in FIG. 5A, in the stiff configuration or the rigid state, the length adapter 410 can be configured such that the valve 438 is in a closed position so as to not allow fluid to transfer between the first and second chambers 428, 430. The one-way valve 440 can be utilized so that the piston 420 and piston rod 422 can move (i.e., displace) to a fully extended position, allowing the passive actuation system 400 to extend to a longest length just prior to and at heel strike. With the valve 438 in the closed position, when an external force is applied to an actuator joint assembly (such as actuator joint assembly 106c) at heel strike of the robotic limb 502 that induces a torque in the actuator joint assembly causing the joint assembly to rotate (e.g., to undergo flexion in the case of the actuator joint assembly 106c at the knee joint), air is compressed in the compression chamber 476 of the passive actuator 450 and the passive actuator 450 can act as an air spring to apply a reactive force based on the pressure of the compressed air in the compression chamber 476. This reactive force is directed to the actuator joint assembly because the length adapter 410 acts as a rigid member in the rigid state with the valve 438 in the closed position. Thus, following heel strike and before toe-off, the passive actuation system 400 can provide force or torque to at least partially compensate for the load applied on the actuator joint assembly at heel strike.

Figure 5B:
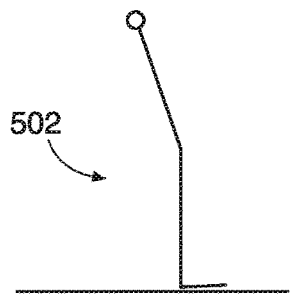
Figure 5B:
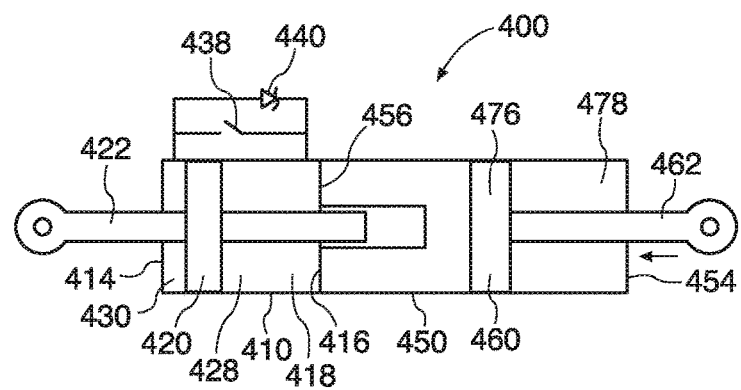
Figure 5C:
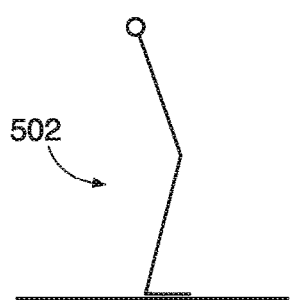
Figure 5C:
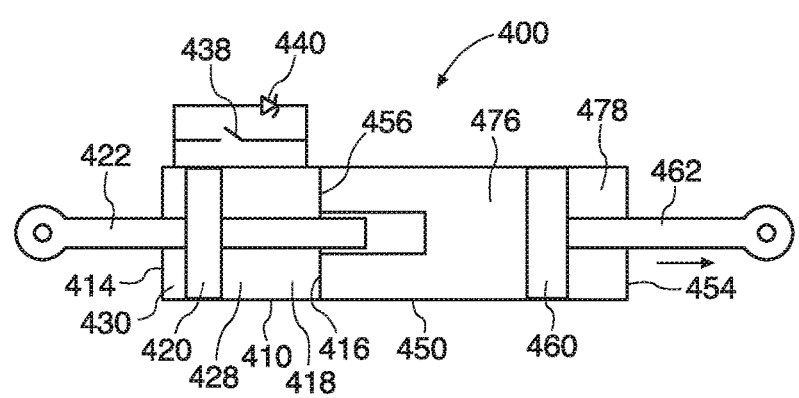

In FIGS. 5B and 5C, the robotic limb 502 is shown between heel strike and toe off of the gait cycle. During this portion of a walking gait, the length adapter 410 remains in the rigid state with the valve 438 in the closed position. This allows the passive actuator 450 to continue to apply a force and a corresponding torque into the joint assembly via its piston rod 462 as the piston rod 462 extends from and retracts into the passive actuator 450. Thus, the passive actuator 450 can continue to provide a reaction force and a torque to the joint assembly (a compensating force and corresponding torque) based on a load experienced at the actuator joint assembly and based on a primary force or torque provided by a primary actuator of the actuator joint assembly as the actuator joint assembly transitions the joint system comprising the joint assembly between heel strike and toe-off.

Figure 5D:
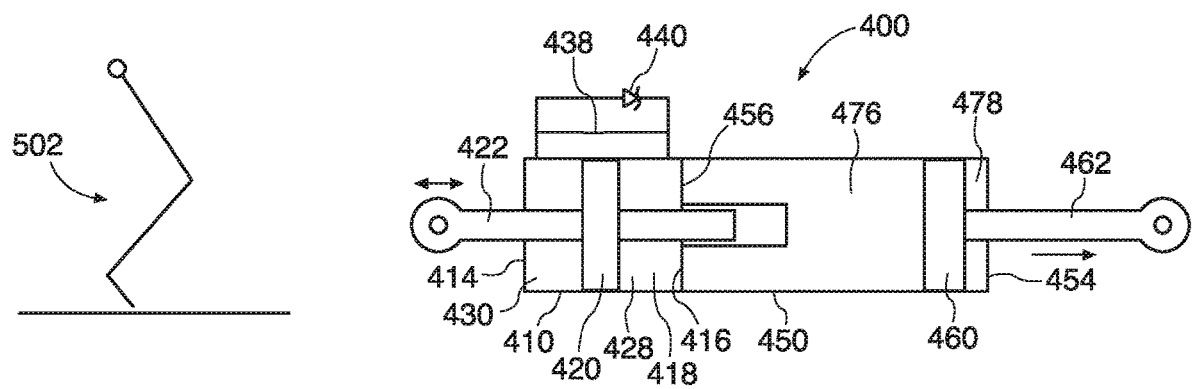

In FIG. 5D, the robotic limb 502 is shown schematically at toe-off during a walking gait. At toe-off, a load or torque applied to the actuator joint assembly decreases as the robotic limb 502 enters the free-swing portion of the walking gait. However, at toe-off, the passive actuator 450 can still have energy stored in in the compression chamber 476. If such energy from the passive actuator were to be directed to the actuator joint assembly, such energy would need to be counteracted by a primary actuator of the joint assembly, or the stiffness of the passive actuator 450 would need to be configured to be relatively low so as to not cause damage to the robotic system or injury to the user when the energy is released into the joint assembly from the passive actuator 450 after toe-off. Thus, because the load applied to an actuator joint assembly varies substantially between a loaded phase of the walking gait from heel strike to toe-off and a free-swing phase of the walking gait from toe-off to heel strike, it is difficult to incorporate a passive actuator suitable for both the loaded phase from heel strike to toe-off and the less loaded or unloaded phase during free swing.

The passive actuation system 400 allows for the passive actuator 450 to be relatively stiff to provide a sufficient force or torque to the actuator joint assembly during the loaded heel strike to toe-off phase while still allowing the actuator joint assembly to operate efficiently during the free swing phase. As shown in FIG. 5D, at toe-off, the passive actuation system 400 can be caused to enter a movable state, wherein the valve 438 of the length adapter 410 is opened to allow fluid to flow between the first and second chambers 428, 430 of the length adapter 410. This allows the piston 420 to displace or move within the internal piston housing 418 of the length adapter 410 and allows the piston rod 422 to retract towards and extend from the first side 414 of the length adapter 410. Therefore, at toe-off, if the passive actuator 450 still has energy stored therein, as the passive actuator 450 pushes its piston rod 462 out of the first end 454 of the passive actuator 450, the piston 420 of the length adapter 410 is operable to move, such as to displace or move within the internal piston chamber 418 towards the second end 416 of the housing 412, and the piston rod 422 of the length adapter 410 can retract into the first side 414 of the length adapter 410, due to the movement (i.e., displacement) of the piston 420 of the length adapter 410. This effectively diverts energy from the passive actuator 450 from being input into the actuator joint assembly and instead into the length adapter 410. Therefore, during the free-swing phase from toe-off to heel strike, the small amount of force or torque required to actuate the actuator joint assembly can be applied by a user and/or a primary actuator, while the passive actuator 450 can be "turned off" such that it does not apply a substantial force or torque to the actuator joint assembly during the free-swing phase.

During the free-swing phase of the gait cycle, the passive actuation system 400 can be returned to the configuration shown in FIG. 5A just prior to heel strike (i.e. the length adapter 410 can be caused to transition from the movable state to the rigid state by closing the valve 438 of the length adapter 410), such as during an extension of an actuator joint assembly during the free-swing phase of the walking gait cycle. Thus, the process described in FIGS. 4-5D can then repeat at heel-strike of the walking gait cycle, as shown in FIG. 5A.

Figure 6:
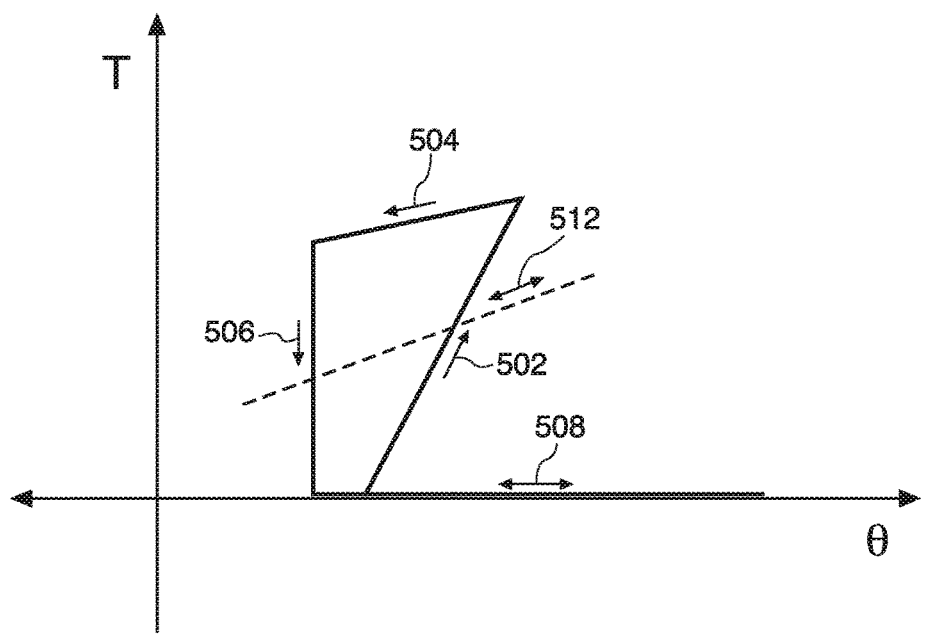
FIG. 6 illustrates an exemplary torque curve showing a torque applied by a passive actuation system of the robotic joint system at various angles during movements of the robotic joint system.

FIG. 6 shows an exemplary torque curve showing a torque applied by the passive actuation system (such as passive actuation system 400) at various joint angles of support members connected at an exemplary knee joint system during a walking gait cycle and during a squatting motion, according to an example of the present disclosure. In FIG. 6, the solid line represents a torque profile for the walking gait cycle, and the broken line represents a torque profile for the squatting motion.

As shown in FIG. 6, during the walking gait cycle, the passive actuation system can apply a steep increase in torque during a heel-strike phase 502. The torque applied by the passive actuation system remains relatively high during a loaded phase 504 from heel-strike to toe-off. At the toe-off phase 506, the passive actuation system is operated to divert energy from the actuator joint assembly, and thus the torque applied by the passive actuation reduces (e.g., drops back to almost zero) at the toe-off phase 506. During the free-swing phase 508, the passive actuation system does not apply a substantial torque to the actuator joint assembly due to the operation of the length adapter, as discussed herein, and the relatively small amount of force needed to actuate the actuator joint assembly during free-swing can be provided by a user or a primary actuator.

Comparatively, the passive actuation system can provide a different torque profile during a squatting movement. As mentioned above with respect to FIG. 4, the passive actuator 450 can comprise a choked flow orifice 466 that can be tuned to have a predetermined flow rate to allow gas to flow from the compression chamber 476 to the expansion chamber 478. In this manner, a smaller amount of energy can be stored during slower movements, and the passive actuator 450 can effectively be less stiff during such slower movements. As shown in FIG. 6, during a squatting motion, a torque applied by the passive actuation system during a descent phase can gradually increase (i.e. during flexion of a knee joint). The torque applied by the passive actuation system during an ascent phase can gradually decrease (i.e. during extension of a knee joint). The torque magnitude and profile can be tailored by a combination of piston, piston rod sizing, gas precharge, size and geometry of the small orifice that connects the compression and expansion chambers of the passive actuator, as well as by the design of the linkage mechanism that couples the length adapter/passive actuator to the joint.

Based on the foregoing, an efficient actuator joint assembly can be provided by utilizing the passive actuator system described herein. The actuator joint assembly can comprise a passive actuator with a high stiffness to provide a desired force or torque to the actuator joint assembly during a loaded phase of a walking or running gate while also providing little to no torque during a free-swing phase of the walking or running gate cycle. The passive actuator can further be modified to accommodate other motions at a joint, such as a squatting motion, by incorporating a choked flow orifice to vary the amount of force or torque applied by the passive actuator. Thus, the actuator joint assembly can deliver the required torque and mechanical power to the joint while using less power from the primary power source (e.g.

batteries). This can allow the actuator joint assembly to be lighter in weight (due to the possibility of using a more compact electric motor and transmission and smaller battery pack) than would be possible without using the passive actuation system described herein. Depending on configuration and activities, the power savings can be 50% or greater as compared to an actuator joint assembly without the passive actuation system described herein. Thus, an efficient joint can be provided during multiple different movements at the joint.

It is noted that the passive actuation system is not limited to an actuator joint assembly. The passive actuation system can be beneficial in other systems where a passive actuator can be utilized at select time periods while also being able to be "turned off" during other select time periods. Thus, the passive actuation system can by selectively configured and operable to release energy to be transferred to first and second members of any external device connected to the passive actuation system while also be operable to absorb energy stored in the passive actuator without transferring the energy to the first and second members of the external device. Thus, the actuator joint assembly is merely one example of an external device with which the passive actuation system can be used.

Figure 7A:
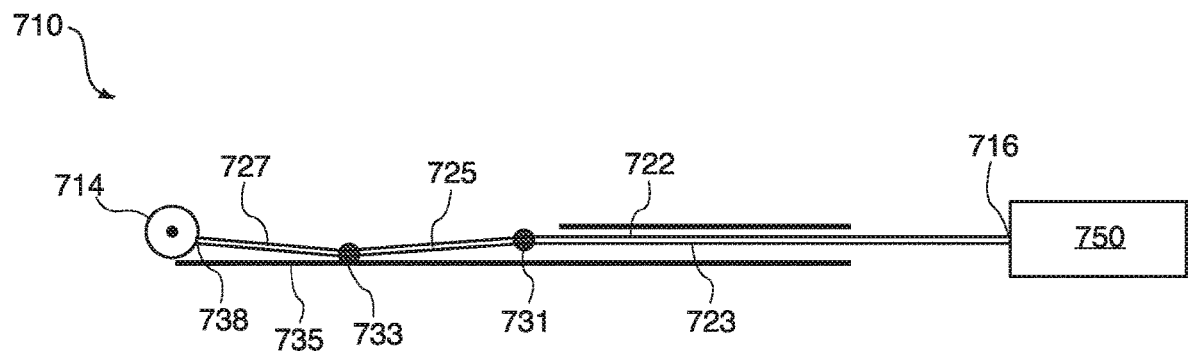
FIGS. 7A-7C show a schematic view of a mechanical length adapter type of a passive actuation system, according to one example of the disclosure.
Figure 7B:
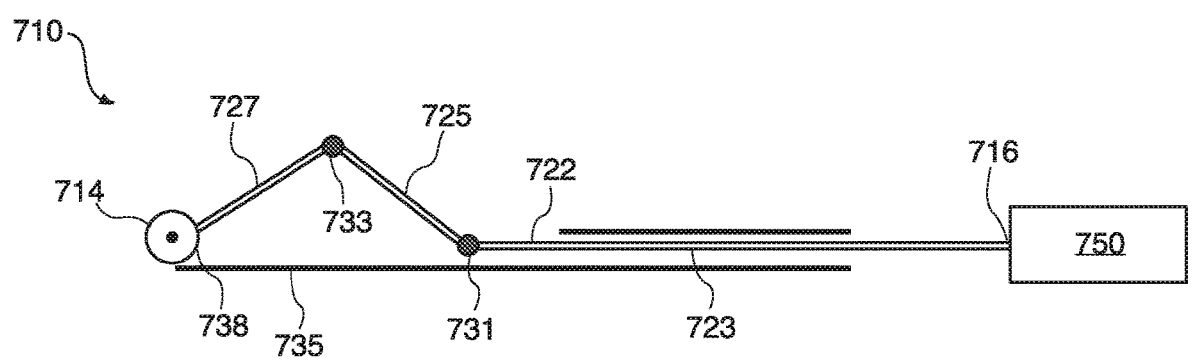
Figure 7C:
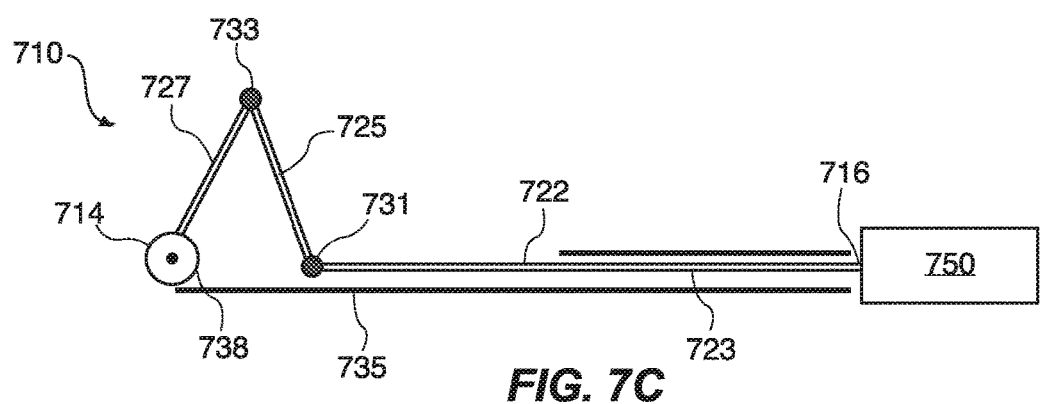

As mentioned above, the length adapter can have different configurations other than the hydraulic device shown in the example with reference to FIGS. 4-5D. FIG. 7A-7C show a schematic view of a mechanical length adapter according to one example of the disclosure. As shown in FIGS. 7A-7C, a length adapter 710 can comprise a mechanical linkage. The length adapter 710 can be configured to be attached to a passive actuator 750 or a quasi-passive actuator, such as the passive actuator 450 described above. The length adapter 710 can comprise a hinged rod 722. The hinged rod 722 can comprise a rigid member coupled to the passive actuator 750. At a first end 714 of the length adapter 410, the hinged rod 722 can be connected to a joint system via an input member, such as joint system 300 via input member 302b described above. At a second end 716 of the length adapter, the hinged rod 722 can be connected to the passive actuator 750. A portion or segment of the hinged rod 722 at the second end 716, namely segment 723, can comprise the rigid member operable to couple to the passive actuator 750. The segment 723 can be coupled to the passive actuator 750, namely the housing of the passive actuator 750, using any coupling device, system or method.

The hinged rod 722 can comprise a plurality of segments connected together via one or more hinges. In this examples, the hinged rod 722 comprise the first segment 723, a second segment 725, and a third segment 727. The first and second segments 723, 725 are connected together at a first hinge 731 that facilitates relative rotation between the first and second segments 723, 724. The second and third segments 725, 727 are connected together at a second hinge 733 that facilitates relative rotation between the second and third segments 725, 727. The length adapter can further comprise a rotary actuator 738. The rotary actuator 738 can control the length adapter 710 to transition between a rigid state and a movable state, as will be described in more detail below. The rotary actuator can be rigidly coupled to the third segment 727 of the hinged rod 722 to facilitate rotation of the third segment 727 about the rotary actuator 738. The rotary actuator 738 can be any suitable actuator and can comprise an active actuator, a passive actuator 750, or a combination thereof. For example, the rotary actuator can comprise an electric motor that drives the rotary actuator. However, other actuators can also be used such as hydraulic or pneumatic actuators.

The hinged rod 722 can be supported by a frame support surface 735. In some examples, the hinged rod 722 can be configured as a bi-stable mechanism to transition between the rigid state and the movable state. For example in FIG. 7A, the length adapter 710 is shown in the rigid state. In the rigid state, the rotary actuator 738 can be operated to rotate the third segment 727 such that the hinged rod 722 is in a hyperextended position. In the hyperextended position, the second hinge 733 can be supported against the frame support surface 735 to lock the hinged rod 722 in the rigid state. With hinged rod 722 in the hyperextended position and the second hinge 733 supported against the frame support surface 735, any longitudinal force applied to the hinged rod 722 (i.e. a force exerted from the second end 716 to the first end 714) will bias the second hinge 733 against the frame support surface 735. Thus, the hinged rod 722 remains rigid and in the same position shown in FIG. 7A. When used in connection with a passive actuator 750 as described above, the length adapter 710 in the rigid state allows the passive actuator 750 to apply a force and corresponding torque to the joint system, similar to the length adapter 410 described above and shown in FIGS. 5A-5C. For example, the length adapter 710 in the rigid state can allow the passive actuator 750 to apply a force and corresponding torque to a joint system between heel strike and toe-off during a walking or running gait cycle of a robotic system.

FIGS. 7B and 7C show the length adapter 710 in the movable state, wherein the length adapter 710 operates to absorb the energy from the passive actuator 750 such that it is not transmitted to the associated joint assembly. It is noted that residual friction associated with the mechanical connections of the length adapter 710 will still allow the passive actuator 750 to contribute a negligible amount to the joint torque even when the length adapter 710 is in its movable state. To transition the length adapter 710 from the rigid state to the movable state, the rotary actuator 738 can be operated to rotate the third segment away from the frame support surface 735 such that the second hinge 733 moves past an unstable equilibrium position. When the second hinge 733 moves past the unstable equilibrium position, a longitudinal force applied to hinged rod will cause the second and third segments 725, 727 to rotate about the second hinge 733 and the first and second segments 723, 725 to rotate about the first hinge 731. The rotation of the segments 723, 725, 727 about the hinges 731, 733 allow an overall length of the length adapter 710 between the first end 714 and the second end 716 to vary, such as to decrease or increase based on applied forces acting on the hinged rod 722. When used in connection with a passive actuator 750 as described above, the length adapter 710 in the movable state allows any stored energy in the passive actuator 750 to be directed to and absorbed by the length adapter 710 instead of to a joint system, similar to the length adapter 410 describe above and shown in FIG. 5D. For example, the length adapter 710 in the movable state can direct stored energy in the passive actuator 750 to be absorbed by the length adapter 710 between toe-off and heel strike phases during a walking or running gait cycle of a robotic system (i.e. during a free-swing phase of a walking or running gait cycle).

Accordingly, the length adapter 710 can be operable similar to the length adapter 410 in that the length adapter 710 can selectively direct the output of stored energy of a passive actuator 750. When the length adapter 710 is in the rigid state, the length adapter 710 can direct the output of the passive actuator 750 to apply a torque or force to the joint system. When the length adapter 710 is in the movable state, the length adapter can direct the output of the passive actuator 750 to be absorbed by the length adapter 710. Thus, the length adapter 710 can allow a passive actuator 750 to provide gravity compensation, or to store and release energy in the passive actuator 750, when a joint system is bearing weight (e.g. between heel-strike and toe-off phases of a gait cycle) and can absorb energy from the passive actuator 750, effectively "turning it off," when a joint system is not bearing weight (e.g. between toe-off and heel-strike phases of the gait cycle).

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A robotic joint system comprising:
   a first support member and a second support member;
   a joint assembly rotatably coupling the first support member to the second support member about an axis of rotation, the joint assembly comprising a passive actuation system coupled between the first and second support members, the passive actuation system comprising:
     a passive actuator operable to store energy and to release energy to apply a first torque to the first and second support members, and
     a length adapter comprising a rigid member coupled to the passive actuator, the length adapter operable to selectively direct an output of the stored energy of the passive actuator.

2. The robotic joint system of claim 1, wherein the length adapter comprises a hydraulic cylinder that is coupled in series with the passive actuator, and that forms the rigid member.

3. The robotic joint system of claim 2, wherein the hydraulic cylinder comprises:
   a piston disposed in an internal piston chamber, the piston separating the internal piston chamber into a first chamber and a second chamber; and
   a piston rod attached to the piston and extending outside the hydraulic cylinder, the piston rod connecting to at least one of the joint assembly, the first support member, or the second support member.

4. The robotic joint system of claim 3, wherein the hydraulic cylinder comprises an incompressible fluid disposed in the first and second chambers.

5. The robotic joint system of claim 3, wherein the length adapter further comprises:
   a fluid passageway connecting the first and second chambers; and
   a valve operable with the fluid passageway to control fluid flow between the first and second chambers,
   wherein, when the valve is closed, the length adapter models a rigid rod, and when the valve is open, the piston is moveable within the internal piston chamber.

6. The robotic joint system of claim 5, wherein the first and second support members comprise an upper leg member and a lower leg member of a robotic system, and wherein the valve is configured to be opened during a free swing phase of a walking gait cycle.

7. The robotic joint system of claim 5, wherein the length adapter further comprises a one-way valve in the fluid passageway, the one-way valve allowing fluid to flow between the first and second chambers to allow the piston and the piston rod to move to an extended position.

8. The robotic joint system of claim 7, wherein the one-way valve comprises an overpressure relief valve.

9. The robotic joint system of claim 3, wherein the piston rod extends from both sides of the piston.

10. The robotic joint system of claim 3, wherein the passive actuator comprises a blind bore into which the piston rod of the length adapter extends.

11. The robotic joint system of claim 1, wherein the passive actuator comprises an actuator piston disposed in an actuator housing, the actuator piston separating an internal piston chamber of the actuator housing into a compression chamber and an expansion chamber.

12. The robotic joint system of claim 11, wherein the passive actuator comprises an orifice operable to act as a choked flow channel connecting the compression chamber and the expansion chamber, the orifice being tuned to control the stored energy in the passive actuator and to control the first torque applied by the passive actuator.

13. The robotic joint system of claim 12, wherein the orifice is disposed in the actuator piston.

14. The robotic joint system of claim 11, wherein the passive actuator comprises a one-way valve between the compression chamber and the expansion chamber, the one-way valve being operable to allow gas to flow from the expansion chamber to the compression chamber when a pressure in the expansion chamber is greater than a pressure in the compression chamber.

15. The robotic joint system of claim 1, wherein the length adapter comprises a mechanical linkage.

16. The robotic joint system of claim 15, wherein the mechanical linkage comprises a hinged rod having a plurality of segments joined by one or more hinges, at least one of the plurality of segments comprising the rigid member coupled to the passive actuator.

17. The robotic joint system of claim 16, further comprising a frame support surface operable to support a hinge of the one or more hinges in a rigid state of the length adapter.

18. The robotic joint system of claim 17, wherein the mechanical linkage comprises a bistable mechanism, the length adapter comprising a rotary actuator operable to rotate a segment of the plurality of segments, and wherein the rotary actuator is operable to rotate the segment and the hinge away from the frame support surface and past an unstable equilibrium to transition the length adapter into a moveable state.

19. The robotic joint system of claim 18, wherein the length adapter directs the output of the stored energy of the passive actuator to apply the first torque when the length adapter is in the rigid state, and wherein the length adapter directs the output of the stored energy of the passive actuator so that the passive actuator does not apply the first torque to the first and second support members when the length adapter is in the movable state.

20. The robotic joint system of claim 18, wherein the joint assembly is disposed at a knee joint and the first support member and a second support member comprise an upper leg member and a lower leg member, respectively, of a robotic leg, and wherein the length adapter is operable to be in the rigid state when the robotic leg is between heel-strike and toe-off during at least one of a walking or running gait cycle, and wherein the length adapter is operable to be in the movable state when the robotic leg is between toe-off and heel-strike during the at least one walking or running gait cycle.

21. A method for recovering energy in a robotic leg during movement, the method comprising:
- at heel strike during a gait cycle of the robotic leg, storing energy in a passive actuator of a joint assembly between first and second support members of the robotic leg and operating a length adaptor coupled to the passive actuator to be in a rigid state;
- between the heel strike and toe-off of the gait cycle of the robotic leg, at least partially returning the stored energy from the passive actuator by a first torque applied by the passive actuator to the first and second support members; and
- at toe-off of the gait cycle of the robotic leg, operating the length adaptor to be in a movable state, such that rotation of the joint assembly is controlled by at least one of a user or a primary actuator of the joint assembly between toe-off and heel strike of the gait, and such that the passive actuator does not apply the first torque to the first and second support members.

22. The method of claim 21, further comprising
- during descent in a squatting cycle, storing energy in the passive actuator; and
- during ascent in a squatting cycle, at least partially returning the stored energy from the passive actuator by a second torque applied by the passive actuator,
- wherein the length adapter is operated in the rigid state during the squatting cycle, and
- wherein the passive actuator is configured to be relatively more rigid during the gait cycle than during the squatting cycle.

* * * * *